(12) United States Patent
Pratt et al.

(10) Patent No.: US 11,132,681 B2
(45) Date of Patent: Sep. 28, 2021

(54) SERVICES FOR ENTITY TRUST CONVEYANCES

(71) Applicant: AT&T INTELLECTUAL PROPERTY I, L.P., Atlanta, GA (US)

(72) Inventors: James Pratt, Round Rock, TX (US); Eric Zavesky, Austin, TX (US); Nigel Bradley, McDonough, GA (US); Timothy Innes, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 212 days.

(21) Appl. No.: 16/029,523

(22) Filed: Jul. 6, 2018

(65) Prior Publication Data
US 2020/0013062 A1    Jan. 9, 2020

(51) Int. Cl.
*G06Q 20/40*    (2012.01)
*H04L 29/06*    (2006.01)

(52) U.S. Cl.
CPC ......... *G06Q 20/4014* (2013.01); *H04L 63/08* (2013.01)

(58) Field of Classification Search
CPC ........... G06Q 20/4014; G06Q 20/4016; G06Q 20/40; G06F 21/00; G06F 21/6218; G06F 21/6245; G06F 21/31; G07C 9/00; H04L 63/00
See application file for complete search history.

(56) References Cited

U.S. PATENT DOCUMENTS

| 6,334,103 | B1 | 12/2001 | Surace et al. |
| 7,565,433 | B1 | 7/2009 | Lamport |
| 7,711,825 | B2 | 5/2010 | Lamport |
| 7,797,261 | B2 | 9/2010 | Yang |

(Continued)

FOREIGN PATENT DOCUMENTS

| EP | 1 197 898 A2 | 2/2004 |
| WO | 2010/009869 A2 | 1/2010 |
| WO | 2020009591 A1 | 1/2020 |

OTHER PUBLICATIONS

Alam, et al. Predicting personality traits using multimodal information, Proceedings of the 2014 ACM Multi Media on Workshop on Computational Personality Recognition. ACM, 2014, 4 pages.

(Continued)

*Primary Examiner* — Scott C Anderson
*Assistant Examiner* — Marla Hudson
(74) *Attorney, Agent, or Firm* — Amin, Turocy & Watson, LLP

(57) ABSTRACT

Services for trust conveyances of entities can be provided and managed. In connection with a transaction between first and second devices, a trust management component (TMC) can indicate trust levels of entities associated with the devices with regard to the transaction and/or an action attempted by an entity. With regard to an action attempted by the first entity, the trust level of the first entity can be evaluated to determine whether it is high enough to allow the action to proceed or to have the second entity respond to the (Continued)

action accordingly. If it is not high enough, the second entity, using the second device, can request a trust conveyance from the first entity via the TMC. The TMC can adjust the respective trust levels based on the outcome(s) of the action(s) of the respective entities with regard to executing the transaction.

20 Claims, 10 Drawing Sheets

(56) References Cited

U.S. PATENT DOCUMENTS

| | | | |
|---|---|---|---|
| 7,856,502 | B2 | 12/2010 | Lamport et al. |
| 7,944,448 | B2 | 5/2011 | Iwamura et al. |
| 8,909,693 | B2 | 12/2014 | Frissora et al. |
| 8,930,815 | B2 | 1/2015 | Moore |
| 8,966,568 | B2 | 2/2015 | Abendroth et al. |
| 9,172,747 | B2 | 10/2015 | Walters et al. |
| 9,276,802 | B2 | 3/2016 | Lynch et al. |
| 9,324,057 | B2 | 4/2016 | Krishnaswamy et al. |
| 9,386,152 | B2 | 7/2016 | Riahi et al. |
| 9,390,243 | B2 | 7/2016 | Dhillon et al. |
| 9,471,638 | B2 | 10/2016 | Roytman et al. |
| 9,479,931 | B2 | 10/2016 | Ortiz et al. |
| 9,501,743 | B2 | 11/2016 | Tur et al. |
| 9,531,695 | B2 | 12/2016 | Koppolu et al. |
| 9,536,065 | B2 | 1/2017 | Bouse et al. |
| 9,762,734 | B1 | 9/2017 | McCarthy-Howe et al. |
| 9,786,299 | B2 | 10/2017 | Un et al. |
| 9,787,841 | B2 | 10/2017 | Chishti et al. |
| 9,805,718 | B2 | 10/2017 | Ayan et al. |
| 9,812,151 | B1 | 11/2017 | Amini et al. |
| 9,817,872 | B2 | 11/2017 | Pamu et al. |
| 9,823,811 | B2 | 11/2017 | Brown et al. |
| 9,830,044 | B2 | 11/2017 | Brown et al. |
| 9,836,177 | B2 | 12/2017 | Brown et al. |
| 9,881,614 | B1 | 1/2018 | Thirukovalluru et al. |
| 9,928,106 | B2 | 3/2018 | Hosabettu et al. |
| 9,934,493 | B2 | 4/2018 | Castinado et al. |
| 9,973,457 | B2 | 5/2018 | Cauchois et al. |
| 10,009,666 | B1 | 6/2018 | van Scheltinga et al. |
| 10,032,137 | B2 | 7/2018 | Skiba et al. |
| 10,043,516 | B2 | 8/2018 | Saddler et al. |
| 10,069,915 | B2 | 9/2018 | Dhuse et al. |
| 10,276,185 | B1 | 4/2019 | Ma et al. |
| 10,388,272 | B1 | 8/2019 | Thomson et al. |
| 10,395,659 | B2 | 8/2019 | Piercy et al. |
| 10,204,627 | B2 | 12/2019 | Nitz et al. |
| 2005/0064374 | A1 | 3/2005 | Spector |
| 2005/0125793 | A1 | 6/2005 | Aguilar, Jr. et al. |
| 2007/0035764 | A1 | 2/2007 | Aldrich et al. |
| 2008/0096533 | A1 | 4/2008 | Manfredi et al. |
| 2008/0159547 | A1 | 7/2008 | Schuler et al. |
| 2008/0269958 | A1 | 10/2008 | Filev et al. |
| 2009/0132371 | A1 | 5/2009 | Strietzel et al. |
| 2009/0209341 | A1 | 8/2009 | Okada |
| 2010/0082515 | A1 | 4/2010 | Relyea et al. |
| 2010/0100907 | A1 | 4/2010 | Chang et al. |
| 2010/0223297 | A1 | 9/2010 | Li et al. |
| 2011/0064388 | A1 | 3/2011 | Brown et al. |
| 2011/0106674 | A1 | 5/2011 | Perlman |
| 2011/0172873 | A1 | 7/2011 | Szwabowski et al. |
| 2011/0193726 | A1 | 8/2011 | Szwabowski et al. |
| 2012/0137367 | A1 | 5/2012 | Dupont et al. |
| 2012/0221504 | A1 | 8/2012 | Rosini et al. |
| 2012/0254280 | A1 | 10/2012 | Parker, II |
| 2013/0006874 | A1 | 1/2013 | Klemm |
| 2013/0081032 | A1 | 3/2013 | Levien et al. |
| 2013/0152092 | A1 | 6/2013 | Yadgar |
| 2013/0219406 | A1 | 8/2013 | Hatabe et al. |
| 2013/0305169 | A1 | 11/2013 | Gold |
| 2013/0332985 | A1* | 12/2013 | Sastry ............... G06F 21/00 726/1 |
| 2014/0053223 | A1 | 2/2014 | Vorobyov et al. |
| 2014/0244712 | A1 | 4/2014 | Walters et al. |
| 2014/0125678 | A1 | 5/2014 | Wang et al. |
| 2014/0160149 | A1 | 6/2014 | Blackstock et al. |
| 2014/0245140 | A1 | 8/2014 | Brown et al. |
| 2014/0310001 | A1 | 10/2014 | Kalns et al. |
| 2014/0365407 | A1 | 12/2014 | Brown et al. |
| 2015/0071450 | A1 | 3/2015 | Boyden et al. |
| 2015/0081361 | A1 | 3/2015 | Lee et al. |
| 2015/0084838 | A1 | 3/2015 | Chang et al. |
| 2015/0088514 | A1 | 3/2015 | Typrin |
| 2015/0169336 | A1 | 6/2015 | Harper et al. |
| 2015/0169383 | A1 | 6/2015 | ven den Berghe |
| 2015/0185996 | A1 | 7/2015 | Brown et al. |
| 2015/0186155 | A1 | 7/2015 | Brown et al. |
| 2015/0213800 | A1 | 7/2015 | Krishnan et al. |
| 2015/0234377 | A1 | 8/2015 | Mizikovsky |
| 2016/0004564 | A1 | 1/2016 | Park et al. |
| 2016/0086500 | A1 | 3/2016 | Kaleal, III |
| 2016/0099892 | A1 | 4/2016 | Palakovich et al. |
| 2016/0119478 | A1 | 4/2016 | Sharpe et al. |
| 2016/0225187 | A1 | 8/2016 | Knipp et al. |
| 2016/0294952 | A1 | 10/2016 | Bodell et al. |
| 2017/0031735 | A1 | 2/2017 | Levien et al. |
| 2017/0068423 | A1 | 3/2017 | Napolitano et al. |
| 2017/0078403 | A1 | 3/2017 | Obata et al. |
| 2017/0124645 | A1 | 5/2017 | Kortina et al. |
| 2017/0154637 | A1 | 6/2017 | Chu et al. |
| 2017/0160813 | A1 | 6/2017 | Divakaran et al. |
| 2017/0163750 | A1 | 6/2017 | Sullivan et al. |
| 2017/0206095 | A1 | 7/2017 | Gibbs et al. |
| 2017/0249104 | A1 | 8/2017 | Moon et al. |
| 2017/0255496 | A1 | 9/2017 | Deng et al. |
| 2017/0269972 | A1 | 9/2017 | Hosabettu et al. |
| 2017/0269975 | A1 | 9/2017 | Wood et al. |
| 2017/0270431 | A1 | 9/2017 | Hosabettu et al. |
| 2017/0289069 | A1 | 10/2017 | Plumb et al. |
| 2017/0300648 | A1 | 10/2017 | Charlap |
| 2017/0344889 | A1 | 11/2017 | Sengupta et al. |
| 2017/0357478 | A1 | 12/2017 | Piersol et al. |
| 2018/0018373 | A1 | 1/2018 | Yazdian et al. |
| 2018/0047029 | A1 | 2/2018 | Saso et al. |
| 2018/0053119 | A1 | 2/2018 | Zeng et al. |
| 2018/0054523 | A1 | 2/2018 | Zhang et al. |
| 2018/0082683 | A1 | 3/2018 | Chen et al. |
| 2018/0095512 | A1 | 4/2018 | Artstain et al. |
| 2018/0095624 | A1 | 4/2018 | Osman et al. |
| 2018/0107930 | A1 | 4/2018 | Aggarwal et al. |
| 2018/0191862 | A1 | 7/2018 | Encarnacion et al. |
| 2018/0197542 | A1 | 7/2018 | Horling et al. |
| 2018/0203847 | A1 | 7/2018 | Akkiraju et al. |
| 2018/0211058 | A1* | 7/2018 | Aunger ............... H04L 63/102 |
| 2018/0232571 | A1 | 8/2018 | Bathiche et al. |
| 2018/0286395 | A1 | 10/2018 | Li et al. |
| 2018/0307542 | A1 | 10/2018 | Kawakami et al. |
| 2018/0314689 | A1 | 11/2018 | Wang et al. |
| 2018/0335903 | A1 | 11/2018 | Coffman et al. |
| 2018/0338038 | A1 | 11/2018 | Ly et al. |
| 2018/0373547 | A1 | 12/2018 | Dawes |
| 2018/0375807 | A1 | 12/2018 | Krans et al. |
| 2019/0073660 | A1 | 3/2019 | Aung et al. |
| 2019/0074987 | A1 | 3/2019 | Wiener et al. |
| 2019/0187787 | A1* | 6/2019 | White ............... G06F 3/167 |
| 2019/0188756 | A1 | 6/2019 | Bradley et al. |
| 2019/0304213 | A1 | 10/2019 | Chen et al. |
| 2019/0371315 | A1 | 12/2019 | Newendorp et al. |
| 2019/0391716 | A1 | 12/2019 | Badr et al. |
| 2020/0013423 | A1 | 1/2020 | Benway et al. |
| 2020/0098358 | A1 | 3/2020 | Rakshit et al. |

OTHER PUBLICATIONS

Siddique, et al. Zara returns: Improved personality induction and adaptation by an empathetic virtual agent, Proceedings of ACL 2017, System Demonstrations (2017): pp. 121-126.

Silva-Coira, et al. Intelligent Virtual Assistant for Gamified Environments, PACIS. 2016. 9 pages.

(56) References Cited

OTHER PUBLICATIONS

Ivanovic, et al. Emotional agents-state of the art and applications, Computer Science and Information Systems 12.4 (2015): pp. 1121-1148.

Feidakis, et al. A Dual-Modal System that Evaluates User's Emotions in Virtual Learning Environments and Responds Affectively, J. UCS 19.11 (2013): pp. 1638-1660.

Gold, Hannah. "Sophia the Robot Would Like to Have a Child Named 'Sophia'" [https://jezebel.com/sophia-the-robot-would-like-to-have-a-child-named-sophi-1820821870] Nov. 28, 2017, 3 pages.

Stone, Zara. "Everything You Need to Know About Sophia, The World's First Robot Citizen" [https://www.forbes.com/sites/zarastone/2017/11/07/everything-you-need-to-know-about-sophia-the-worlds-first-robot-citizen/#158f4eeb46fa], Nov. 7, 2017, 8 pages.

Kemeny, Richard. "Anti-Swearing AI Takes the Edge off Abuse on Reddit and Twitter New Scientist" [https://www.newscientist.com/article/2170650-anti-swearing-ai-takes-the-edge-off-abuse-on-reddit-and-twitter/] Jun. 4, 2018, 3 pages.

Leviathan, et al. "Google Duplex: An AI System for Accomplishing Real-World Tasks Over the Phone" [https://ai.googleblog.com/2018/05/duplex-ai-system-for-natural-conversation.html], Google AI Blog, May 8, 2018, 7 pages.

Holley, Peter. "This app knows when you've been in an accident—and then it calls 911 for you". The Washington Post [https://www.washingtonpost.com/technology/2018/10/02/this-app-knows-when-youve-been-an-accident-then-it-calls-you/?noredirect=on]. Oct. 2, 2018. Retrieved Oct. 5, 2018. 3 pages.

Non-Final Office Action received for U.S. Appl. No. 16/171,067 dated Dec. 2, 2019, 36 pages.

Non-Final Office Action received for U.S. Appl. No. 16/129,267 dated Jan. 27, 2020, 28 pages.

Final Office Action received for U.S. Appl. No. 16/171,067 dated Jun. 12, 2020, 51 pages.

Notice of Allowance received for U.S. Appl. No. 16/129,267 dated Jun. 10, 2020, 24 pages.

Non-Final Office Action received for U.S. Appl. No. 16/221,418 dated Apr. 16, 2020, 44 pages.

Final Office Action received for U.S. Appl. No. 16/221,418 dated Jul. 29, 2020, 38 pages.

Final Office Action received for U.S. Appl. No. 16/221,418 dated Mar. 8, 2021, 46 pages.

Non Final Office Action received for U.S. Appl. No. 16/221,418 dated Nov. 10, 2020, 40 pages.

Non Final Office Action received for U.S. Appl. No. 16/171,067 dated Jul. 23, 2021, 56 pages.

\* cited by examiner

SERVICES FOR ENTITY TRUST CONVEYANCES

TECHNICAL FIELD

This disclosure relates generally to commerce and transactions, e.g., to services for entity trust conveyances.

BACKGROUND

Communication devices (e.g., mobile phones, electronic pads or tablets, computers, . . . ) can be utilized to engage in online-related commerce and/or perform transactions between entities associated with the communication devices. For instance, a first communication device of a first user can be utilized to engage in a transaction with a second communication device of a second user.

The above-described description is merely intended to provide a contextual overview regarding online-related commerce and transactions, and is not intended to be exhaustive.

DETAILED DESCRIPTION

Figure 1:
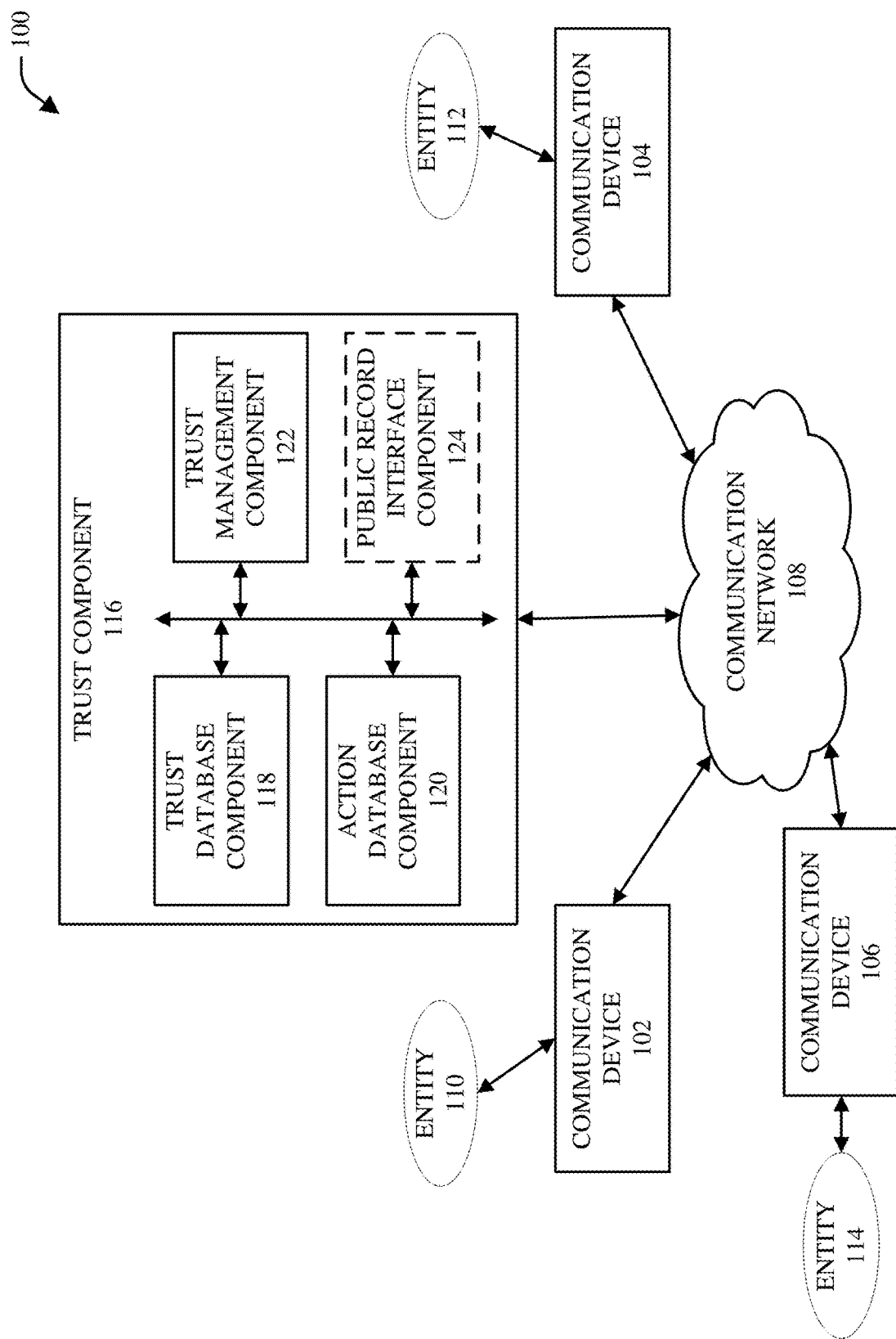
FIG. 1 illustrates a block diagram of an example system that can provide and manage trust-related services and trust levels associated with entities in connection with transactions and interactions between entities, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., mobile phones, electronic pads or tablets, computers, devices in or integrated with vehicles, . . . ), can operate and communicate via wireline or wireless communication connections (e.g., communication links or channels) in a communication network to perform desired transfers of data, transactions, and/or other operations. For example, communication devices can be utilized to engage in online-related commerce and/or perform transactions between entities associated with the communication devices, wherein the entities can comprise human users or other users or entities, such as virtual assistants and/or software entities or components.

In certain modern systems, interactions of entities (e.g., interactions of people and software processes) can have relatively no or at least relatively little lasting culpability with regard to their interaction with other endpoints (e.g., other entities). Instead, after a problem has occurred, individual or other (e.g., software) entities often can be audited by individual contacts or by the recipient of the action. Alternatively, services and lists can be created to blacklist or whitelist entities as good or bad entities, respectively, and that list information can be conveyed to the recipient from the list provider. However, neither of these techniques allow for dynamic evaluation of trust (e.g., trust between entities), the recipient evaluating the level or longevity of trust, or a balance of trust levels versus a potential action that is being attempted (e.g., in connection with a transaction).

To that end, techniques for managing trust levels of entities (e.g., users (e.g., human users), virtual assistants (VAs) and other software-based entities, . . . ), trust services, and transactions are presented. The disclosed subject matter can provide real-time trust conveyance systems, methods, machine-readable mediums, and techniques that can allow an entity (e.g., a recipient of a transaction request) to evaluate and modulate a trust level of another entity (e.g., an actor presenting the transaction request) in connection with a proposed transaction or other interaction between the two entities, wherein the other entity can be a person or a VA or other software-based entity. The disclosed subject matter can employ a centralized (or de-centralized) trust service that can include a trust bank that can maintain respective trust levels of respective entities. Positive actions (e.g., appropriately performing actions during a transaction) by an entity can increase the trust level of the entity, negative actions (e.g., failing to appropriately perform an action during a transaction) can decrease the trust level of the entity, wherein a trust level can even potentially be a negative score (e.g., if the entity's negative actions are continuous and/or substantial). The trust service of the system can update the trust levels of entities according to the respective actions of entities and/or respective trust conveyances provided by the entities.

When a first entity (e.g., an actor, such as a VA or person) uses a communication device to communicate a message (e.g., a transaction request) to a communication device of a second entity (e.g., to have the second entity purchase a product or service from the first entity), the second entity (e.g., recipient) can utilize the trust service to evaluate the trust level of the first entity versus the action attempted by the first entity (e.g., requesting bank card information from the second entity to purchase a product or service), wherein the second entity, or the trust service (e.g., trust component providing the trust service) on behalf of the second entity, can determine the amount of trust that is desired to execute the transaction or respond to the attempted action (e.g., by providing bank card information), where the transaction or response to the attempted action can involve a financial-related response (e.g., providing bank card information), work-related response (e.g., perform work), and/or other type of response.

For instance, the disclosed subject matter can comprise a trust component that can include a trust management component that can manage a trust database (e.g., a trust bank), trust services, and transactions between entities. In connection with a transaction between the first communication device and first entity and the second communication device and second entity, the trust management component can indicate the respective trust levels of the respective entities associated with the communication devices with regard to the transaction and/or an action attempted by an entity (e.g., the first entity). With regard to an action attempted by the first entity, the second entity, the second communication device of the second entity, and/or the trust management component on behalf of the second entity, can evaluate the trust level of the first entity to determine whether it is high enough to allow the action of the first entity (e.g., request bank card information from the second entity) to proceed and/or to have the second entity respond to the action of the first entity accordingly.

If the trust level of the first entity is determined to not be high enough with respect to the attempted action, the second entity, using the second communication device, and/or the trust management component on behalf of the second entity, can request that the first entity provide a trust conveyance (e.g., authentication or business credentials of the first entity, verified reviews of the first entity, . . . ) to the trust management component, for example, for presentation and evaluation by the second entity, the second communication device, and/or the trust management component in relation to the attempted action. If the trust level, including the trust conveyance, of the first entity is determined to be sufficient in relation to the attempted action (e.g., trust level satisfies an applicable trust threshold level with respect to the attempted action), the second entity, second communication device, and/or the trust management component on behalf of the second entity, can respond to the attempted action, for example, by providing the first entity the desired information (e.g., bank card information of the second entity) and/or engaging in a transaction with the first entity. If the trust level, including the trust conveyance, of the first entity is determined to still not be sufficient, the second entity, second communication device, and/or the trust management component on behalf of the second entity, can deny or not respond to the attempted action of the first entity and/or can decline to engage in the transaction with the first entity.

If the second entity, second communication device, and/or the trust management component on behalf of the second entity, had determined that the trust level of the first entity was sufficiently high enough with respect to the attempted action of the first entity (e.g., satisfied an applicable trust threshold level with respect to the attempted action), even without the first entity providing a trust conveyance, the second entity, second communication device, and/or the trust management component on behalf of the second entity can respond to the attempted action, for example, by providing the first entity the desired information and/or engaging in a transaction with the first entity.

The trust management component can adjust (e.g., modify) the respective trust levels based at least in part on the outcome(s) of the action(s) of the respective entities with regard to executing the transaction. For example, if the trust management component determines that the first entity and/or the second entity appropriately and/or successfully performed actions during the transaction, the trust management component can increase the respective trust levels of the first entity and/or second entity in the trust database. If the trust management component determines that the first entity and/or the second entity did not appropriately and/or successfully perform actions during the transaction, the trust management component can decrease the respective trust levels of the first entity and/or second entity in the trust database.

In some instances though, even if an entity (e.g., first entity) does not successfully perform an action or if the action otherwise fails, the trust management component can determine that the trust level of the entity can remain at the current trust level, when doing so is in accordance with defined trust criteria. For example, if the entity has a sufficiently high trust level (e.g., a trust level that satisfies a defined threshold trust level that indicates the entity has a very good track record of performing actions and transactions appropriately and successfully), the trust management component can determine that the trust level of the entity can remain at the current trust level, in accordance with the defined trust criteria. As another example, if the entity made a good faith effort to perform the action, but the action still failed (e.g., attempted to verify financial information provided for payment by another entity, but the payment still failed), the trust management component can determine that the trust level of the entity can remain at the current trust level, in accordance with the defined trust criteria.

The disclosed subject matter, by employing the trust component, including the trust management component, trust database, and other features, as more fully described herein, therefore can be useful and beneficial in enabling entities to have sufficient knowledge regarding other entities in connection with attempted actions and transaction to make an informed determination as to whether to engage in actions and transactions with other entities, including whether other entities are sufficiently trustworthy to make engaging in actions and transactions with them desirable (e.g., suitable, appropriate, or acceptable), and can enhance security of transactions for entities. The disclosed subject matter can provide real-time evaluation of a trust assertion for an entity (e.g., VA, other software-based entity, an actual person), can increase security of actions and transactions between entities and can facilitate avoiding intermediate, but faulty systems.

The disclosed subject matter can have the ability to track trust (e.g., track trust levels) for entities through more than merely identities of entities (e.g., can track trust based on performance of actions and execution of transactions by entities). The disclosed subject matter can provide transparent rules regarding trust, as, for example, the trust component can manage and maintain a balance sheet (e.g., a trust balance sheet) in the trust database, wherein the trust management component can utilize the balance sheet to manage and assert trust with respect to entities.

The disclosed subject matter also can facilitate building up a trusted community of entities (e.g., actual persons, business entities, VAs, other software-based entities, . . . ) that can objectively be asserted and evaluated by other entities (e.g., other entities of the community, or other entities in general). The disclosed subject matter further can provide the ability for entities to establish line of credit (e.g., for trust) so that intermediate transactions are not continually asserted, which can facilitate the performance of high-speed transactions, for example.

The disclosed subject matter can employ VAs and enable the use of VAs to act as intermediaries and/or navigators for and on behalf of entities, for example, with regard to trusted transactions. The disclosed subject matter (e.g., trust management component) further can track specific behaviors of entities, can map to a desired granular level, such as, for example, mapping to individual transactions, interactions, and/or actions within transactions or interactions associated with entities (e.g., purchase history, reviews, comments, etc., associated with entities).

These and other aspects and embodiments of the disclosed subject matter will now be described with respect to the drawings.

Referring now to the drawings, FIG. 1 illustrates a block diagram of an example system 100 that can provide and manage trust-related services and trust levels associated with entities in connection with transactions and interactions between entities, in accordance with various aspects and embodiments of the disclosed subject matter. The system 100 can comprise a set (e.g., a plurality) of communication devices, which can include, for example, communication device 102, communication device 104, and communication device 106. A communication device can be, for example, a mobile and/or wireless communication device, such as a mobile phone, an electronic notebook, an electronic pad or tablet, an electronic gaming device, a personal digital assistant (PDA), electronic bodywear (e.g., electronic or smart glasses, electronic or smart watch) a computer, a set-top box, or other type of communication device that can operate and communicate in a communication network environment of a communication network 108 of the system 100.

The communication network 108 can comprise a radio access network (RAN) (not shown) that can comprise or be associated with a set of base stations (e.g., access points (APs)) (not shown) that can serve communication devices (e.g., 102, 104, and/or 106, . . . ) located in respective coverage areas served by respective base stations in the communication network 108. In some embodiments, the RAN can be a cloud-RAN (C-RAN) that can be located in or associated with a cloud computing environment, comprising various cloud network components of the communication network 108.

The respective base stations can be associated with one or more sectors (not shown), wherein respective sectors can comprise respective cells. The cells can have respective coverage areas that can form the coverage area covered by the one or more sectors. The respective communication devices (e.g., 102, 104, and/or 106, . . . ) can be communicatively connected to the communication network 108 via respective wireless communication connections with one or more of the respective cells.

The respective communication devices (e.g., 102, 104, and/or 106, . . . ) can be associated with or comprise respective entities, such as, for example, entity 110, entity 112, and entity 114. The entities (e.g., 110, 112, and/or 114, . . . ) can respectively be, for example, a human (e.g., a human user), a virtual assistant (VA) or other software-based entity, or a business entity (e.g., a store, a corporation, and/or a service or product provider, . . . ). A VA can be domain-specific VA or can be a generalized (or at least more generalized) VA. For example, a domain-specific VA can be created and utilized to provide products or services for one or a relatively small subset of domains (e.g., a VA that provides or facilitates providing food-related products or services; a VA that provides or facilitates providing video and/or audio content-related products or services; a VA that provides or facilitates providing sports-related products or services; . . . ). As another example, a generalized (or more generalized) VA can be created and utilized to provide products or services for all domains or at least a relatively large subset of domains.

The disclosed subject matter can enable the use of VAs to act as intermediaries and/or navigators for and on behalf of entities, for example, with regard to trusted transactions. As more fully described herein, the disclosed subject matter can track specific behaviors of entities, can map to a desired granular level, such as, for example, mapping to individual transactions, interactions, and/or actions within transactions or interactions associated with entities (e.g., purchase history, reviews, comments, etc., associated with entities), to facilitate providing a desirable (e.g., improved, enhanced, or suitable) amount of trust between entities with regard to transactions and underlying actions of transactions.

The system 100 can comprise a trust component 116 that can be associated with (e.g., communicatively connected to) the communication network 108 to enable the trust component to be associated with and communicate with the communication devices (e.g., 102, 104, and/or 106, . . . ) and associated entities (e.g., 110, 112, and/or 114, . . . ). The trust component 116 can comprise the ability to track trust (e.g., track trust levels) for entities (e.g., 110, 112, 114, . . . ) through more than merely identities of entities (e.g., can track trust based on performance of actions and execution of transactions by entities). The trust component 116 also can provide transparent rules regarding trust, as, for example, the trust component 116 can manage and maintain a balance sheet (e.g., a trust balance sheet) in the trust database component 118, wherein the trust component 116 can utilize the balance sheet to manage and assert trust with respect to entities in connection with transactions, including underlying actions associated with the transactions.

The trust component 116 can employ various techniques for managing trust levels of the entities (e.g., 110, 112, and/or 114, . . . ), trust services provided by the trust component 116, and transactions and interactions between the entities (e.g., 110, 112, and/or 114, . . . ). The trust component 116 can provide real-time trust conveyance techniques that can allow an entity (e.g., entity 112, such as a recipient of a transaction request) to evaluate and modulate a trust level of another entity (e.g., entity 110, such as an actor presenting the transaction request) in connection with a proposed transaction or other interaction between the two entities.

The trust component 116 can employ a centralized (or de-centralized) trust service that can comprise a trust database component 118 (e.g., a trust bank) that can maintain respective trust levels of the respective entities (e.g., 110, 112, and/or 114, . . . ). The trust component 116, including the trust database component 118, can comprise a trust bank that can be a central or distributed service that can allow human users (e.g., human entities) and/or software-based entities to objectively assert trust (e.g., trust of an entity) with respect to transactions or underlying actions of transaction, and add or subtract trust from other entities (e.g., add trust for successful or good transactions, actions, or interactions; subtract trust for unsuccessful or poorly performed transactions, actions, or interactions) with which they interact. Positive actions (e.g., appropriately or successfully performing actions during a transaction) by an entity (e.g., 110, 112, or 114) can increase the trust level of the entity, and negative actions (e.g., failing to appropriately or diligently perform an action during a transaction) can decrease the trust level of the entity. In managing trust levels, the trust component 116 can even determine (e.g., potentially determine) that a trust level of an entity can be a negative score (e.g., if the entity's negative actions are continuous and/or substantial), in accordance with defined trust criteria. The trust component 116 can update the trust levels of entities (e.g., 110, 112, and/or 114) according to the respective actions of entities and/or respective trust conveyances provided by the entities, as more fully described herein.

The trust component 116, with such features, and other features as described herein, can provide an automated and/or dynamic capability to improve the provision of services and products based at least in part on trust identified (e.g., reliably determined and identified), established, or asserted between entities, in accordance with the defined trust criteria. With the features of the trust component 116, as more fully disclosed herein, users can be assured that they are no longer merely left to post-mortem audits or reliance on an external trust system in order to have a desirable amount of trust in the provision of services or products between entities. Further, with the features of the trust component 116, as more fully disclosed herein, a trust level of an entity (e.g., entity 110) can be available for real-time queries of trust and reliance for another entity (e.g., entity 112, which can be a person, or a VA or software-based entity), instead of quasi-security or substandard security that may be available from a whitelist/blacklist or from non-real-time validation, such as from a history of entities alone.

The trust component 116 can include an action database component 120 that can maintain information relating to various types of actions, particular actions associated with entities, respective trust levels desired in connection with respective actions, and/or other desired information relating to actions. For instance, the action database component 120 can comprise information that can indicate a threshold trust level that an entity (e.g., entity 110) is to have with regard to a particular action attempted by the entity with respect to another entity (e.g., entity 112) in connection with a proposed transaction. For example, a first type of attempted action (e.g., a request for bank card information from the other entity) can be associated with a first threshold trust level, and a second type of attempted action (e.g., a request for the other entity to provide an email address) can be associated with a second threshold trust level, which can be different from (e.g., lower than) the first threshold trust level.

The trust component 116 also can comprise a trust management component 122 that can facilitate providing and managing trust services for the entities (e.g., 110, 112, 114, . . . ), including managing and updating the trust database component 118 and action database component 120 with respect to trust levels of entities, presenting of trust conveyances by entities, performances of actions and transactions by entities, and/or other interactions between entities.

When a first entity (e.g., entity 110), which can be an actor, such as a VA or person, uses a communication device (e.g., communication device 102) to communicate a message (e.g., a transaction request or action request in connection with a proposed transaction) to another communication device (e.g., communication device 102) of a second entity (e.g., entity 112), for example, to have the second entity purchase a product or service from the first entity), the second entity (e.g., recipient) can utilize the trust service provided by the trust component 116 to evaluate the trust level of the first entity (e.g., entity 110) versus the action attempted by the first entity (e.g., requesting bank card information from the second entity to purchase a product or service), wherein the second entity (e.g., entity 112), or the trust management component 122 acting on behalf of the second entity, can determine the amount of trust that is desired to execute the transaction or respond to the attempted action (e.g., by providing bank card information), wherein the transaction or response action (e.g., by the second entity) to the attempted action can involve a financial-related response (e.g., providing bank card information), work-related response (e.g., perform work), and/or other type of response. For instance, the second entity (e.g., entity 112) may be unsure whether the first entity (e.g., entity 110) is a trustworthy person or VA, or is a malicious or untrustworthy person or VA (e.g., a malicious bot). The trust component 116 can be employed to provide desirable (e.g., sufficient or suitable) information to the second entity, and/or act on behalf of the second entity, to desirably determine whether the first entity is sufficiently trustworthy or not with regard to the transaction or an underlying action (e.g., attempted action by the first entity; response action by the second entity), such as more fully described herein.

For instance, in connection with a transaction between the first communication device and first entity and the second communication device and second entity, the trust management component 122 can determine the respective trust levels of the respective entities (e.g., 110, 112), can present the first trust level of the first entity (e.g., 110) to the communication device (e.g., 104) of the second entity (e.g., 112), and can present the second trust level of the second entity (e.g., 112) to the communication device (e.g., 102) of the first entity (e.g., 110) with regard to the transaction and/or an action attempted by an entity (e.g., 110). With regard to an action attempted by the first entity (e.g., 110), the second entity (e.g., 112), the second communication device (e.g., 104) of the second entity acting on behalf of the second entity, and/or the trust management component 122 acting on behalf of the second entity, can evaluate the trust level of the first entity (e.g., 110) to determine whether the trust level of the first entity is high enough (e.g., satisfies an applicable threshold trust level) to allow the action attempted by the first entity (e.g., request bank card information from the second entity) to proceed and/or to have the second entity (e.g., 112) respond to the action of the first entity accordingly.

If, with respect to the attempted action of the first entity (e.g., 110), the trust level of the first entity is determined (e.g., automatically determined) to not be high enough (e.g., does not satisfy the applicable threshold trust level, the second entity (e.g., 112), using the second communication device (e.g., 104), the communication device (e.g., 104) acting on behalf of the second entity, and/or the trust management component 122 acting on behalf of the second entity, can request that the first entity (e.g., 110) provide a trust conveyance (e.g., authentication or business credentials of the first entity, verified reviews of the first entity, . . . ) to the trust management component 122, for example, for presentation and evaluation by the second entity (e.g., 112), the communication device (e.g., 104) of the second entity, and/or the trust management component 122 in relation to the attempted action. If the trust level, including the trust conveyance, of the first entity (e.g., 110) is determined (e.g., automatically determined) to be sufficiently high (e.g., determined to satisfy the applicable threshold trust level) in relation to the attempted action, the second entity (e.g., 112), communication device (e.g., 104) of the second entity acting on behalf of the second entity, and/or the trust management component 122 acting on behalf of the second entity, can respond to the attempted action of the first entity (e.g., 110), for example, by providing the first entity the desired information (e.g., bank card information of the second entity (e.g., 112)) and/or engaging in a transaction with the first entity. If the trust level, including the trust conveyance, of the first entity is determined to still not be sufficient, the second entity (e.g., 112), communication device (e.g., 104) of the second entity, and/or the trust management component 122 acting on behalf of the second entity, can deny or not respond to the attempted action of the first entity and/or can decline to engage in the transaction with the first entity.

If the second entity (e.g., 112), communication device (e.g., 104) of the second entity, and/or the trust management component 122 acting on behalf of the second entity, had determined that the trust level of the first entity (e.g., 110) was sufficiently high enough (e.g., satisfied an applicable trust threshold level) with respect to the attempted action of the first entity, even without the first entity providing a trust conveyance, the second entity, communication device (e.g., 104) of the second entity, and/or the trust management component 122 acting on behalf of the second entity can respond to the attempted action, for example, by providing the first entity the desired information (e.g., financial information of the second entity or other requested information) and/or engaging in a transaction with the first entity.

The trust management component 122 can monitor the performance of the respective actions by the respective entities (e.g., 110, 112, . . . ) during execution of the transaction. The trust management component 122 can adjust (e.g., modify) the respective trust levels based at least in part on the outcome(s) of the action(s) of the respective entities with regard to executing the transaction and the transaction overall. For example, if the trust management component 122 determines that the first entity (e.g., 110) and/or the second entity (e.g., 112) appropriately and/or successfully performed their respective actions during the transaction, the trust management component 122 can increase the respective trust levels of the first entity and/or second entity in the trust database component 118.

In some instances though, even if an entity (e.g., 110) appropriately and/or successfully performed actions during the transaction and the transaction was successful, the trust management component 122 can determine that the trust level of the entity is not to be increased (e.g., is to remain the same), in accordance with (e.g., when indicated by) the defined trust criteria. For example, if the entity already has a relatively high trust level and/or the transaction, and/or the underlying actions performed by the entity, was (or were) relatively minor (e.g., small), the trust management component 122 can determine that the trust level of the entity is not to be increased, even if the entity appropriately and/or successfully performed actions during the transaction and the transaction was successful.

Also, in some embodiments, in response to determining that an entity (e.g., 110) successfully performed a transaction with regard to a particular context (e.g., type of activity, type of service or product, . . . ), the trust management component 122 can determine whether respective trust levels of the entity (e.g., 110), a particular trust level associated with the particular context (e.g., pizza purchase) and a general trust level associated with all or many contexts (e.g., pizza/food services; video and/or audio content services; sports-related services; . . . ), are to be respectively increased or are to remain the same. For example, the trust management component 122 can determine that the particular trust level for the particular context is to be increased by a certain amount based at least in part on determining that the entity desirably performed actions during execution of a successful transaction relating to the particular context, but for one or more reasons (e.g., the transaction was relatively small in scale), also can determine that the general or overall trust level for the entity is not to be increased or is only to be increased by a smaller amount than the certain amount of increase in trust for the particular trust level, in accordance with the defined trust criteria.

If the trust management component 122 determines that the first entity (e.g., 110) and/or the second entity (e.g., 112) did not appropriately and/or successfully perform their respective actions during the transaction, the trust management component 122 can decrease the respective trust levels of the first entity and/or second entity in the trust database component 118. In some instances though, even if an entity (e.g., entity 110) does not successfully perform an action or if the action otherwise fails, the trust management component 122 can determine that the trust level of the entity can remain at the current trust level, when doing so is in accordance with defined trust criteria. For example, if the entity (e.g., entity 110) has a sufficiently high trust level (e.g., a trust level that satisfies a defined threshold trust level that indicates the entity has a very good track record of performing actions and transactions appropriately and successfully), the trust management component 122 can determine that the trust level of the entity can remain at the current trust level, in accordance with the defined trust criteria. As another example, if the entity (e.g., 110) made a good faith and/or diligent effort to perform the action, but the action still failed (e.g., attempted to verify financial information provided for payment by another entity, but the payment still failed), the trust management component 122 can determine that the trust level of the entity can remain at the current trust level, in accordance with the defined trust criteria. As still another example, if the entity (e.g., 110) failed during performance of an action (e.g., sent financial information provided for payment by another entity, but the payment failed), but the entity was subsequently able to rectify the failure and perform the action relatively quickly thereafter (e.g., entity was able to send verifiable financial information soon thereafter), the trust management component 122 can determine that the trust level of the entity can remain at the current trust level, in accordance with the defined trust criteria.

Figure 2:
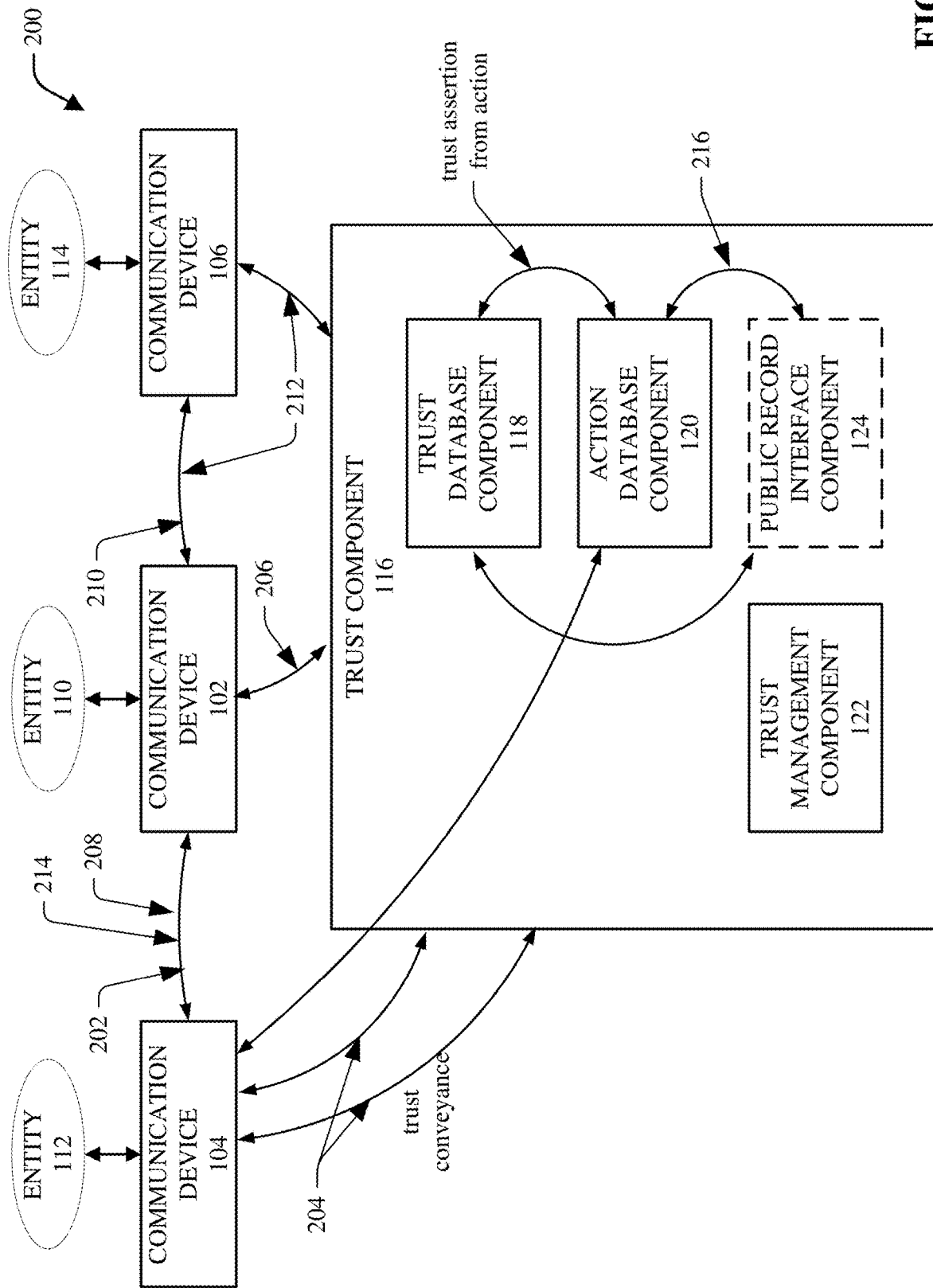
FIG. 2 depicts a diagram of an example interaction between entities using the trust component and associated trust services, in accordance with various aspects and embodiments of the disclosed subject matter.

Other aspects and embodiments of the disclosed subject matter will be described with regard to the other figures (and/or FIG. 1). Referring briefly to FIG. 2 (along with FIG. 1), FIG. 2 depicts a diagram of an example interaction 200 between entities using the trust component and associated trust services, in accordance with various aspects and embodiments of the disclosed subject matter. The example interaction 200 can relate to, for example, a second entity 112 interacting (e.g., interfacing) with a first entity 110, as depicted at reference numeral 202, wherein the second entity 112 can be a human user (or VA or other software-based entity) and the first entity 110 can be a new entity, which can be a VA (or other human user or software-based entity).

In the example interaction 200, the second entity 112 can be interacting in a typical fashion with the communication device 104 of the second entity or other resources (e.g., local resources). The first entity 110 can use its communication device 102 to communicate a message (e.g., "do you want a pizza?") to the communication device 104 of the second entity 112 to inquire as to whether the second entity 112 desires a product or service (e.g., pizza) that can be provided or facilitated by the first entity 110. The second entity 112, using the communication device 104, can respond in the affirmative to the message received from the communication device 104 of the first entity 110.

In response to receiving the affirmative response message, the first entity 110 responds by asking for a particular action of the second entity 112 for which the second entity 112 can desire some level of trust with the first entity 110 before performing the particular action (e.g., a response action). For example, the particular action can be a relatively unusual action to have requested by an entity that is new or unknown to the second entity 112 and/or can ask for sensitive or private information and/or something of value of the second entity 112 (e.g., debit or credit card information, direct payment of money) and/or can ask the second entity 112 take an action that can have security implications (e.g., download and install an application on the communication device 104 of the second entity 112).

As indicated by reference numeral 204, in response to the attempted action of the first entity 110 to request that the second entity 112 perform the particular action (e.g., response action), the second entity 112 can desire a trust conveyance from the first entity 110 to decide whether the first entity 110 is sufficiently trustworthy before deciding whether to perform the particular action requested by the first entity 110. The second entity 112, using the communication device 104, can communicate a trust query to the trust component 116 via the communication network 108 (not shown in FIG. 2) to use the trust services provided by the trust component 116.

As indicated by reference numeral 206, the trust management component 122 can facilitate communicating a trust conveyance request to the communication device 102 of the first entity 110 to request that the first entity 110 provide a sufficient trust conveyance to the trust component 116 (and thereby the second entity 112). For instance, the trust management component 122 in conjunction with the action database component 120 to determine the type(s) and/or amount of trust conveyance to request from the first entity 110 and can generate the trust conveyance request to request the determined trust conveyance from the first entity 110.

In response to the trust conveyance request, the first entity 110 (e.g., VA) can accept the request and can offer to present (e.g., deposit) a trust conveyance, using communication device 102, to the trust component 116 (as depicted in FIG. 2) or to the communication device 104 associated with the second entity 112, wherein, if the trust conveyance is presented (e.g., directly presented) to the communication device 104, the second entity 112 (e.g., using the communication device 104) can evaluate the trust conveyance (e.g., to determine whether the trust conveyance is sufficient with respect to the attempted action by the first entity 110) and/or can present (e.g., communicate) and/or assert or deposit the trust conveyance to, with, and/or in the trust database component 118 (e.g., trust bank). The trust management component 122 can store the trust conveyance in the trust database component 118. For example, the first entity 110, using the communication device 102, can present the trust conveyance to the trust component 116 or the communication device 104 associated with the second entity 112, wherein the trust conveyance can comprise, for example, reviews (e.g., traditional reviews) of the first entity 110 to vouch for or verify that the first entity 110 is credible and trustworthy. In accordance with various embodiments, the first entity 110, using the communication device 102, can present the trust conveyance to the trust component 116 (or communication device 104) by providing credentials (e.g., linkage of the first entity 110 to a major and/or known business), providing a location and/or execution audit trail (e.g., where software can operate), providing a third-party trust symbol of business against another service (e.g., the first entity 110 has a trust or trust-related symbol from a third-party organization), providing a link to a trusted and/or known architecture (e.g., trusted computing architecture, platform, and/or service), and/or allowing a secondary contact point for the second entity 112 to assert or bank trust of the first entity 110.

Additionally or alternatively (e.g., optionally), in providing (e.g., presenting or communicating) a trust conveyance, the first entity 110, using the communication device 102, can present information regarding other trust-related attributes of the first entity 110 (or associated entity, such as a human user associated with the VA) that can indicate, or at least attempt to indicate, that the first entity 110 is sufficiently trustworthy with respect to the attempted action of the first entity 110 to request the particular action of the second entity 112. The information regarding the other trust-related attributes of the first entity 110 (or associated entity) can relate to, for example the behavior of the first entity 110 (or associated entity), wherein the behavior can relate to a history of successful transactions of the first entity 110 (or associated entity) with other individuals, businesses, and/or software points (e.g., software-based entities).

Additionally or alternatively (e.g., optionally), in providing a trust conveyance, the first entity 110 (or associated entity), using the communication device 102 or other suitable means, can provide (e.g., deposit) a fiduciary backing to the trust component 116 or another acceptable entity (e.g., escrow entity, insurance entity) to insure against any loss that may occur from the transaction (e.g., trust transaction). For example, the first entity 110 (or associated entity), using the communication device 102 or other suitable means, can provide a fiduciary backing by depositing a suitable monetary amount or other collateral with an escrow company and/or purchasing insurance from an insurance company to insure the transaction between the first entity 110 and second entity 112.

Additionally or alternatively (e.g., optionally), the first entity 110 (or associated entity), using the communication device 102 or other suitable means, can provide (e.g., express) the extent, purpose, and/or scope of the requested information associated with the particular action requested from the second entity 112. For example, the first entity 110 (or associated entity) can indicate that the requested information (e.g., name, phone identifier or number, financial-related information, etc., of the second entity 112) is only to be stored in a temporary location for a temporary amount of time.

As indicated by reference numeral 208, in response to the trust conveyance (e.g., a suitable trust conveyance) being provided by the first entity 110, the second entity 112 can decide to allow the transaction to occur, including performing the response action. For instance, the second entity 112, the communication device 104 acting on behalf of the second entity 112, or the trust management component 122 acting on behalf of the second entity 112 can evaluate the trust conveyance provided by the first entity 110 to determine whether it is acceptable (e.g., suitable or sufficient) in relation to the response action of the second entity 112 that was requested by the first entity 110. In some embodiments, the communication device 104 acting on behalf of the second entity 112 or the trust management component 122 acting on behalf of the second entity 112 can evaluate (e.g., automatically evaluate) the trust conveyance and determine whether it is acceptable in relation to the response action based at least in part on the entity (e.g., user) profile of the second entity 112 and/or information provided by the second entity 112, in accordance with the defined trust criteria, wherein the entity profile or the provided information can indicate, for example, what trust conveyance(s) or what trust level is acceptable (e.g., satisfies a threshold trust level) in relation to the response action. The entity profiles of respective entities (e.g., 110, 112, 114, . . . ) can be stored in a data store (not shown in FIG. 1) of the trust component 116 and/or in the trust database component 118. In other embodiments, the second entity 112 can evaluate the trust conveyance provided by the first entity 110 (or trust level of the first entity 110) and can determine whether the trust conveyance (or trust level) is acceptable in relation to the response action.

In response to determining that the trust conveyance (or trust level) of the first entity 110 is acceptable, the second entity 112, the communication device 104 acting on behalf of the second entity 112, or the trust management component 122 acting on behalf of the second entity 112 can approve the response action and going forward with the transaction. When the second entity 112 has individually evaluated the trust conveyance (or trust level) and decided to give approval to proceed with the response action and transaction, the second entity 112, using the communication device 104, can assert the trust level (e.g., the trust value) from the first entity 110 (e.g., VA) in the trust database component 118 (e.g., trust bank), for example, by providing information or a token equivalent of the trust level to the trust component 116. The second entity 112 via the communication device 104 and/or the trust management component 122 can perform the requested response action (e.g., provide debit or credit card information or direct payment of money; or download and install an application on the communication device 104 of the second entity 112). For example, if the transaction relates to the second entity 112 purchasing a pizza via the first entity 110, the requested response action can be to provide payment, and the second entity 112 via the communication device 104 and/or the trust management component 122 can perform the response action by providing debit or credit card information or other form of payment.

As depicted by reference numeral 210, in response to the response action being performed by the second entity 112 (or by the communication device 104 or the trust component 116 on behalf of the second entity 112), the first entity 110 can begin to interact with a back-end service (e.g., back-end food creation service), such as a third entity 114 (e.g., pizza shop) that can provide the desired service. In some instances, the third entity 114 can have a pre-existing relationship with the first entity 110 (or can be part of the first entity 110, or vice versa). In such instances, the third entity 114 can accept the service order for the service and/or product (e.g., the pizza) from the first entity 110 without the first entity 110 requesting authentication or a trust conveyance from the first entity 110 as a condition of accepting the service order.

In other instances, the first entity 110 may not have a pre-existing relationship with, or may not have a sufficient pre-existing relationship with, the third entity 114 in relation to the service order (e.g., the size of the service order) for the third entity 114 to accept the service order without the first entity 110 providing authentication information, having a suitable trust level, and/or providing a trust conveyance to the third entity 114. For example, for a service order that is a large transaction, the third entity 114 can decide that it does not want to expend the resources and expense to provide the service or product with the first entity 110 (e.g., as an intermediary) without a showing from the first entity 110 that it is sufficiently trustworthy. In such other instances, the first entity 110 can provide authentication information, present a trust level (e.g., via the trust component 116), and/or provide a trust conveyance (e.g., via the trust component 116) to the communication device 106 of the third entity 114, as more fully described herein, to satisfy the third entity 114 that the first entity 110 is sufficiently trustworthy with respect to the service order, and, in response, the third entity 114 can agree to accept the service order to provide the service or product to the second entity 112. For example, the first entity 110 (or an associated entity), using communication device 102, can submit a suitable trust conveyance to the third entity 114 via the trust component 116 to satisfy the third entity 114 that the first entity 110 is sufficiently trustworthy. For instance, if the first entity 110 is a VA, the trust conveyance can include a human user associated with the first entity 110 providing authentication information, financial-related information (e.g., bank card information, credit check information), or other type of trust conveyance to the third entity 114.

In connection with the service order, as indicated by reference numeral 212, the first entity 110, using communication device 102, can communicate financial transaction and/or execution information to the communication device 106 of the third entity 114 (e.g., via the communication network 108 and/or trust component 116), wherein the financial transaction and/or execution information can include, for example, payment information (e.g., debit or credit card information) obtained from the second entity 112 in connection with the transaction, identification of the recipient (e.g., second entity 112) of the service or product, identification of the service or product ordered, etc. If the financial transaction and/or execution information is in order, including the payment information being verified, the third entity can proceed to process the service order for the transaction, and the service order can be fulfilled by providing the desired service or product to the second entity 112 (e.g., the pizza can be provided or delivered to the second entity 112).

If, however, verification of the payment information fails (e.g., due to the second entity 112 (or the first entity 110) providing incorrect payment information or fraudulent payment information), the third entity 114, using communication device 106, can assert failure of the verification of the payment information with the trust component 116. In response to this assertion, the trust management component 122 can determine whether the trust level of the first entity 110 (and/or the trust level of the second entity 112) is to be reduced based at least in part on the payment information verification failing, in accordance with the defined trust criteria. In some instances, the trust management component 122 can determine that the trust level of the first entity 110 is to be reduced due to the payment information verification failing in connection with the transaction, in accordance with the defined trust criteria. In other instances, such as, for example, if the first entity 110 made a reasonable, good faith, and/or diligent (e.g., due diligent) effort to verify the payment information of the second entity 112 before presenting it to the third entity 114, if the first entity 110 is able to rectify the payment problem relatively quickly (e.g., by getting valid payment information from the second entity 112, or correcting a mistake in the payment information presented to the third entity 114), or if the first entity 110 has a sufficiently high trust level, the trust management component 122 can determine that the trust level of the first entity 110 is not to be reduced as a result of the failed verification of the payment information.

In response to a failure of verification of the payment information, as desired, the third entity 114 can decide to cancel the transaction (e.g., cancel the service order), allow the first entity 110 an opportunity to rectify the problem with payment (e.g., while suspending action on the service order until the payment problem is resolved), or continue to proceed with fulfilling the service order and transaction. For example, in response to failure of verification of the payment information, the third entity 114 can decide to continue to proceed with fulfilling the service order or transaction because the trust level of the first entity 110 in the trust database component 118 is relatively high (e.g., satisfies a defined threshold trust level), or because of the nature of the relationship between the first entity 110 and third entity 114 (e.g., the first entity 110 is part of the third entity 114, or vice versa; the first entity 110 has a significant and good pre-existing relationship with the third entity 114). For instance, the trust level of the first entity 110 can be relatively high due to a large number of successful transactions in its history, and/or a history or ability to resolve failures in payment with regard to transactions.

As indicated by reference numeral 214, in response to a failure to verify the payment information, the first entity 110, using communication device 102, can return to the second entity 112 to request additional or alternate (e.g., correct and/or verifiable) payment information from the second entity 112 (e.g., via communication device 104). The second entity 112, using communication device 104, can communicate additional or alternate (e.g., correct and/or verifiable) payment information to the communication device 102 of the first entity 110. The first entity 110, using communication device 102, can communicate the additional or alternate payment information to the communication device 106 of the third entity 114. If processing of the transaction (e.g., service order of the transaction) had been suspended by the third entity 114, in response to verifying the additional or alternate payment information, the transaction, including fulfillment of the service order, can resume and proceed. If the trust level of the first entity 110 (or the trust level of the second entity 112) was otherwise going to be reduced as a result of the initial payment failure, and the first entity 110 (and/or second entity 112) acted quickly enough (e.g., within a defined amount of time) to rectify the payment failure and provide verifiable payment information, in some embodiments, the trust management component 122 can determine that the trust level of the first entity 110 (and/or the trust level of the second entity 112) is not to be reduced as a result of the initial payment failure, in accordance with (e.g., when doing so is in accordance with) the defined trust criteria.

If, however, the second entity 112 provides additional payment information that also is not verifiable, and payment again fails, the first entity 110 can assert such payment failure with the trust component 116, and the trust management component 122 can determine (e.g., can frequently or usually determine) that the trust level of the second entity 112 is to be reduced by a specified amount, reduce the second entity's trust level accordingly, and store the reduced trust level of the second entity 112 in the trust database component 118, in accordance with the defined trust criteria. Additionally or alternatively, the third entity 114 can assert such payment failure with the trust component 116, and the trust management component 122 can determine whether the trust level of the first entity 110 is to be reduced by a particular amount, and, if so, can reduce the first entity's trust level accordingly, and store the reduced trust level of the first entity 110 in the trust database component 118, in accordance with the defined trust criteria. As desired (e.g., optionally), for example, in response to persistent human error (e.g., by second entity 112) or other error, to mitigate or eliminate a reduction in the trust level of the first entity 110, the first entity 110, using communication device 102, can communicate with the third entity 114 (e.g., via communication device 106) to inform the third entity 114 about the due process employed to attempt to successfully process the transaction(s), in an effort to convince the third entity 114 to not pursue a trust level penalty against the first entity 110 or (if the trust level penalty has already been implemented) to convince the third entity 114 (e.g., via communication device 106) to contact the trust component 116 to reverse all or some of the trust level penalty to the trust level of the first entity 110.

In some embodiments, to facilitate mitigating future requests for mediation of transaction issues, as depicted at reference numeral 216, the trust component 116 can employ the public records interface component 124 that can maintain secure and public records of transactions. This can enable the respective actions performed by respective entities in connection with a transaction to be tracked and logged in an electronic ledger in a secure manner. As a new transaction or new action is performed or attempted by an entity (or entities), or has failed to be performed by the entity (or entities), the trust management component 122, operating in conjunction with the public records interface component 124, to track the new transaction or new action, and the actions and/or interactions of the entity (or entities) with respect to such transaction or action, and can accordingly update the electronic ledger to include information regarding the new transaction or new action, and the actions and/or interactions of the entity (or entities) with respect to such transaction or action.

The electronic ledger maintained by the public records interface component 124 can be public and verifiable. Since the records maintained in the electronic ledger are tracked, public, and verifiable, problems that may arise in connection with transactions often can be readily discernible from the electronic ledger, which often can render mediation unnecessary and thereby mitigate mediation requests.

In certain embodiments, the public records interface component 124 can employ a blockchain or blockchain-type technology. In other embodiments, the public records interface component 124 can utilize a different type of technology that can track and log transactions, actions, and/or interactions of entities in an electronic ledger in a secure, verifiable, and/or public manner.

Another example regarding the use of trust services in the trust environment provided by the trust component 116 can involve instances when users are attempting or proposing actions or transactions across different types of activities. For example, a first entity 110 can be a VA, and a second entity 112 can be a human entity. The first entity 110 (e.g., VA) can have a certain level of trust with the second entity 112 (e.g., human entity) with regard to a particular activity (e g, running or jogging activity). The first entity 110, using communication device 102, can attempt to identify and connect to other entities (e.g., other human entities or other VAs), such as a third entity 114 (e.g., via communication device 106), who engage in or are associated with the particular activity (e.g., running or jogging activity) based on (e.g., using) certain trust attributes (e.g., typically running at the same time(s), does not have a history of canceling appointments to run with other runners, reliable action with regard to running activities, . . . ) associated with the particular activity. For instance, the first entity 110, using the communication device 102, can communicate with the trust component 116 to search for and identify one or more entities (e.g., third entity 114) that have all, or at least a sufficient number, of the certain attributes relating to the particular activity. The trust management component 122 can filter out from the search results entities that do not have all or at least the sufficient number of the certain attributes. The first entity 110, using communication device 102, can attempt to identify and connect to the other entities, such as the third entity 114 (e.g., via communication device 106), who have been determined to engage in or are associated with the particular activity (e.g., based at least in part on the search results).

The third entity 114 can decide to accept the connection request of the first entity 110, for example, based at least in part on the trust level of the first entity 110 with regard to the particular activity, as shown by the trust database component 118, being sufficiently high enough for the third entity 114 to determine that the first entity 110 is sufficiently trustworthy enough to accept the connection request from the first entity 110.

In this example scenario, the first entity 110 can attempt to connect (e.g. interface) with the third entity 114 across a different activity or action, such as, for example, doing taxes (e.g., tax return preparation) or a contract for work for hire. While the first entity 110 can have a first trust level with the third entity 114 with regard to the particular activity (e.g., running or jogging activity), the first entity 110 has not established a relationship, or a sufficient relationship, with the third entity 114 (or other entities) with regard to such different activity or action. As a result, the trust component 116 can determine and maintain (e.g., in the trust database component 118) a second trust level for the first entity 110 with the third entity 114 (and/or other entities) with regard to such different activity or action, in accordance with the defined trust criteria, wherein the second trust level can be relatively lower than the first trust level. The trust component 116 can determine that the second (e.g., lower) trust level is to be different than the first trust level based at least in part on the different context (e.g., different activity) of the attempted interaction by the first entity 110 with the third entity 114.

In this example scenario, in some embodiments, the third entity 114, the communication device 106 acting on behalf of the third entity 114, or the trust management component 122 acting on behalf of the third entity 114 can decline, or at least initially decline, to permit the attempted different activity or action by the first entity 110 based at least in part on the trust level of the first entity 110 being determined to be too low (e.g., determined to not satisfy the applicable threshold trust level) with respect to the attempted different activity or action by the first entity 110, in accordance with the defined trust criteria. In some embodiments, the applicable threshold trust level can be a default threshold trust level that the trust management component 122 can apply, for example, with regard to initial transactions or actions relating to certain types of activities (e.g., activities or actions that can involve sensitive data of entities, such as financial transactions or actions). In other embodiments, the applicable threshold trust level can be a certain threshold trust level that the third entity 114 can determine and/or select (e.g., using communication device 106) for application to transactions or actions (e.g., initial transactions or actions) relating to the certain types of activities. For example, as desired, the third entity 114 can select a higher (or lower) threshold trust level than the default threshold trust level for application with regard to accepting or issuing trust levels of other entities in connection with transactions or actions (e.g., initial transactions or actions) relating to the certain types of activities.

In the example scenario, after the first entity 110 connects with the third entity 114 with regard to the particular activity (e.g., running or jogging), the second entity 112 and the third entity 114 can be indirectly connected via the first entity 110, as the second entity 112 has interfaced with the first entity 110, and the first entity 110 also has connected to the third entity 114. In certain embodiments, the services provided or enabled between the second entity 112 and third entity 114 via the trust component 116 can have reduced functionality, at least initially, since there is a relatively minimal relationship between the second entity 112 and third entity 114, at least initially. In some embodiments, certain services between the second entity 112 and third entity 114 can be disabled or denied (e.g., not immediately permitted), at least initially, by the trust component 116 due at least in part to insufficient trust levels between the second entity 112 and third entity 114 with respect to the particular activity or another type(s) of activity. The certain services can relate to, for example, services where entities will be asked to provide sensitive and/or financial-related information. In still other embodiments, the trust component 116 can implement threshold trust levels that can be fixed and hard, at least initially, such that respective contexts (e.g., type of activity, type of transaction, type of action, . . . ) can have respective threshold trust levels (e.g., minimum threshold trust levels) that have to be satisfied (e.g., met or exceeded) by trust levels of entities (e.g., 110, 112, 114, . . . ) in order for certain services to be initiated or continued.

The second entity 112 and third entity 114 can respectively "level up" (e.g., increase trust levels) or "level down" (e.g., decrease trust levels) with respect to each other and/or with respect to other entities over time with regard to the particular activity (e.g., running or jogging) or other (e.g., different) types of activities. For instance, in response to a successful performance of a transaction or an action by the second entity 112 with respect to the third entity 114 (and vice versa) or another entity, the trust management component 122 determine that the trust level of the second entity 112 can be increased with respect to the third entity 114 and/or other entities with respect to the particular activity and/or other types of activities. The trust management component 122 can store the increased trust level in the trust database component 118. Also, if the trust management component 122 (or an entity or associated communication device) determines that the trust level (e.g., modified or increased trust level) of the second entity 112 is sufficiently high enough (e.g., satisfies an applicable threshold trust level), for example, with respect to the third entity 114 and/or vice versa, the trust management component 122 (or an entity (e.g., 112 or 114) or associated communication device) can determine that the functionality with regard to services and/or the types of activities or actions that can be approved between the second entity 112 and third entity 114 can be increased.

Conversely, in response to a failure of performance of a transaction or an action by the second entity 112 with respect to the third entity 114 (or vice versa) or another entity, the trust management component 122 can determine that the trust level of the second entity 112 is to be decreased with respect to the third entity 114 and/or other entities with respect to the particular activity and/or other types of activities. The trust management component 122 can store the decreased trust level in the trust database component 118. Also, the trust management component 122 (or an entity (e.g., 112 or 114) or associated communication device) can determine that the functionality with regard to services and/or the types of activities or actions that can be approved between the second entity 112 and third entity 114 is to remain the same or can be decreased based at least in part on the decreased trust level(s).

To facilitate improving trust between entities, in some embodiments, the trust component 116 can generate and/or facilitate enabling the use of certain user interfaces between entities (e.g., entity 112 and entity 114) to show more transparency with respect to the entities (e.g., in relation to each other). Such user interfaces can be employed, for example, to improve (e.g., increase, or at least temporarily increase) the trust level of an entity (e.g., entity 112) with respect to another entity (e.g., entity 114) with regard to a particular context (e.g., a particular activity, a particular transaction, a particular action, . . . ) and/or to petition (e.g., petition the trust component 116 or the other entity) for reconsideration with regard to the particular context (e.g., reconsideration of being denied the ability or functionality to attempt or execute a particular transaction or action). The trust component 116 can treat the use of such user interfaces by an entity (e.g., entity 112) as an act of trust (e.g., a trust conveyance), for example, to enhance the trust level of the entity with respect to the other entity (e.g., entity 114).

The trust component 116 also can monitor and track transactions, actions, and activities of respective entities (e.g., 110, 112, 114, . . . ), and can collect and maintain (e.g., optionally collect and maintain) information regarding the service score of the performance of transactions and actions by entities (e.g., service score indicating how well an entity performed a transaction or action), as well as other information regarding the performance of transactions and actions by entities, in the public records interface component 124, which can collect and maintain (e.g., store) secure, public, and verifiable records of transactions and actions (e.g., with regard to respective activities), as more fully described herein. For example, information regarding the service score and the other information regarding the performance of transactions and actions by entities (e.g., 110, 112, 114, . . . ) can be stored in the electronic ledger (e.g., digital ledger).

In some embodiments, the trust management component 122 can enable an entity (e.g., entity 110, such as a VA or a human entity) to establish a line of credit with regard to trust. For instance, if an entity (e.g., entity 110) has established a sufficient amount of trust (e.g., has a trust level that satisfies an applicable threshold trust level for establishing a line of credit with regard to trust), for certain activities, transactions, and/or actions, the trust management component 122 can make certain options available (e.g., with regard to certain activities, transactions, and/or actions) without the entity having to settle after performance or execution of each unique transaction or action. For example, if an entity (e.g., entity 110) has established a sufficient amount of trust, and does a significant number of transactions per day, instead of the trust management component 122 using the time and resources to perform a settlement (e.g., trust evaluation settlement) after each of those transactions (e.g., perform settlement by evaluating the performance of the entity after each transaction, including evaluating individual actions performed by the entity during the transaction), the trust management component 122 can perform a settlement for the entity with respect to the performance of the entity for all of the entity's transactions for the day (or other period of time, such as week or month), or perform settlements for the entity with respect to respective subsets of the entity's transactions during respective time periods of the day.

As another example, if an entity (e.g., entity 110) has established a sufficient amount of trust, and engages in or performs actions or intermediate transactions of a transaction, the trust management component 122 can perform the settlement with regard to the transaction after the entire transaction, including the actions and intermediate transactions of the transaction, has been executed, instead of performing a settlement after each of the actions or intermediate transactions have been performed. This can be useful, for example, with regard to transactions (e.g., high-speed transactions) for which higher speed in the execution of actions or intermediate transactions can be desirable. Further, the trust component 116, including the trust management component 122, by enabling sufficiently trustworthy entities (e.g., entity 110) to establish a line of credit with regard to trust, services or products can be preordered and/or executed by another entity (e.g., 112) knowing that the entity (e.g., entity 110, such as a service or product provider) can be expected (e.g., reasonably expected with a desirable level of trust) to properly execute the transaction(s) and deliver the product or service as desired by the other entity.

Also, the trust component 116, employing the trust management component 122 and other components and features of the trust component 116, can balance the scale of a transaction(s) against a potential amount of trust credit. For example, the trust component 116 can facilitate enabling a relatively small transaction(s) to be executed based at least in part on a relatively small level of trust between the entities associated with the transaction(s). In contrast, with regard to a larger scale transaction(s), such as, for example, an enterprise transaction across many smaller points that, overall, amount to a relatively large transaction, the trust component 116 can facilitate ensuring that there is a sufficiently and relatively large trust level between the entities associated with the transaction(s) to ensure that the transaction(s) will be properly executed.

In certain embodiments, the trust component 116 can facilitate creating a mesh network (e.g., trusted mesh network) of communication devices (e.g., 102, 104, 106, . . . ) and associated entities (e.g., 110, 112, 114, . . . ) to perform larger tasks (e.g., larger transactions), wherein respective communication devices and associated respective entities can perform respective portions (e.g., sub-tasks) of a large task. For instance, an entity (e.g., 114) can desire a large transaction that can involve a large task, which can be broken up into a set of smaller tasks. If a set of communication devices (e.g., 102, 104, . . . ) associated with a set of entities (e.g., 110, 112, . . . ) are sufficiently trusted enough (e.g., satisfy an applicable threshold trust level) to respectively perform the respective sub-tasks of the transaction, the respective communication devices (e.g., 102, 104, . . . ) and respective entities (e.g., 110, 112, . . . ) can be opportunistically utilized to perform the respective sub-tasks of the transaction (e.g., in a coordinated manner, if and as desired). A communication device (e.g., 102) and/or associated entity (e.g., 110) can be sufficiently trusted enough by the trust component 116 to be in the trusted mesh network and perform a sub-task(s) of a transaction, for example, if they have a history of not being hacked and/or no other record of loss of trust (e.g., as determined by the trust management component 122). One non-limiting example use of this mesh network of trusted communication devices and associated entities can be to deliver content to the communication device (e.g., 106) of an entity (e.g., 114) that desires the content, wherein the respective trusted communication devices (e.g., 102, 104, . . . ) of the trusted mesh network can perform respective sub-tasks (e.g., in coordination with each other, or otherwise) to deliver respective portions of the content to the communication device (e.g., 106) of the entity (e.g., 114) that desires the content. Thus, this transaction can be accomplished using this mesh network, for example, instead of using a traditional content delivery network (CDN) and/or a torrent network to complete the task or transaction (e.g., to deliver content).

Figure 3:
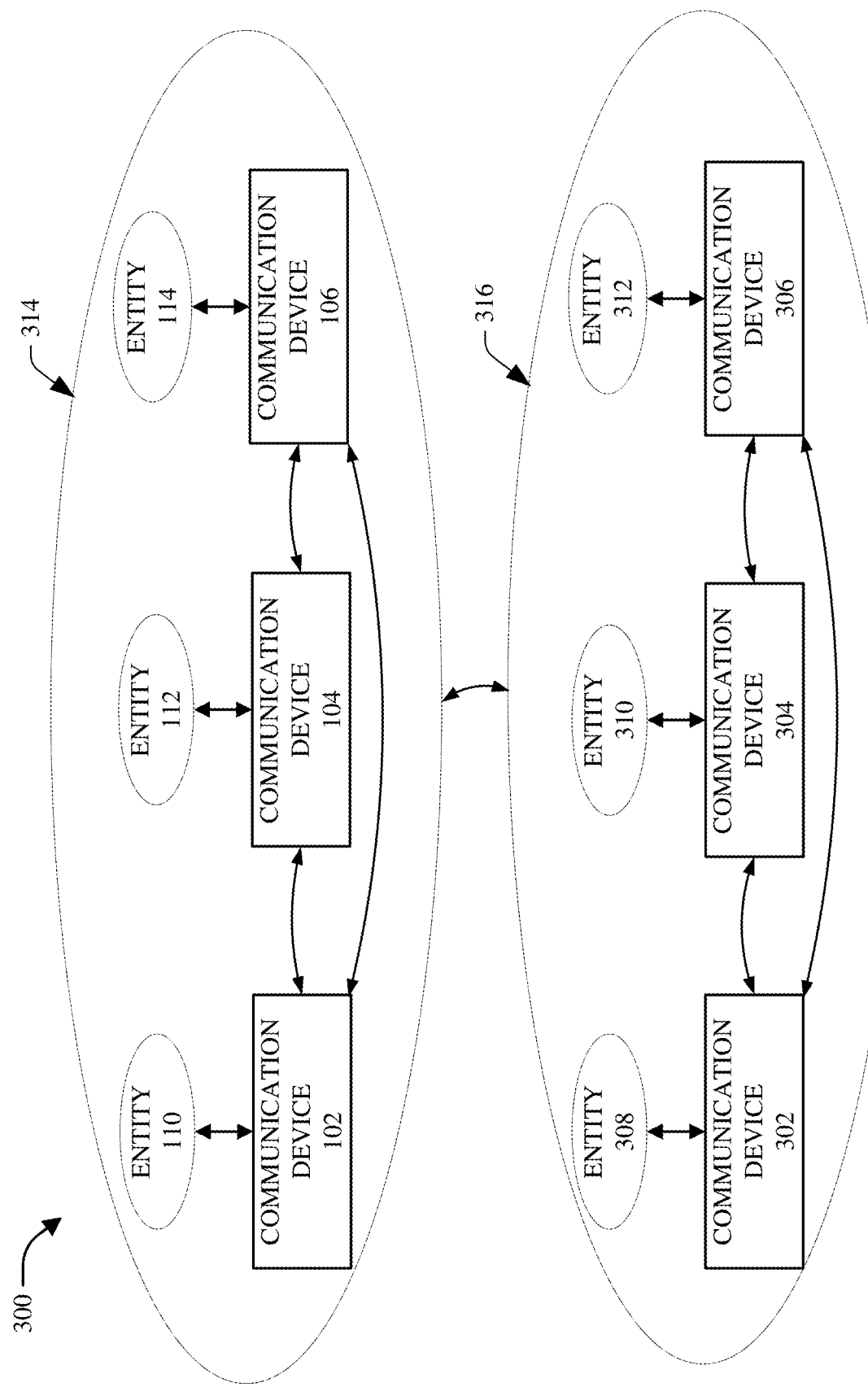
FIG. 3 depicts a block diagram of an example distributed trust network, in accordance with various aspects and embodiments of the disclosed subject matter.

Referring briefly to FIG. 3 (along with FIG. 1), FIG. 3 depicts a block diagram of an example distributed trust network 300, in accordance with various aspects and embodiments of the disclosed subject matter. The distributed trust network 300 can be part of the system (e.g., system 100). The trust component 116 (or a set of trust components) can create or facilitate creating the distributed trust network 300, wherein the trust component(s) 116 can form or facilitate forming respective subsets of communication devices (e.g., 102, 104, 106, . . . ; 302, 304, 306, . . . ) and associated subsets of entities (e.g., 110, 112, 114, . . . ; 308, 310, 312, . . . ) into respective sub-communities (e.g., 314, 316, . . . ) that can establish trust among each other (e.g., network node peers (e.g., communication devices and associated entities) and their interaction with other network node peers can establish trust with each other). For instance, respective peers of a sub-community of peers (e.g., 314), the respective peers comprising a subset of communication devices (e.g., 102, 104, and 106, . . . ) and associated subset of entities (e.g., 110, 112, and 114, . . . ), can interact with each other (e.g., perform transactions and actions with each other) to form respective trust levels with each other. Further, the sub-community of peers (e.g., 314) can interact with another sub-community of peers (e.g., 316), comprising another subset of communication devices (e.g., 302, 304, and 306, . . . ) and associated subset of entities (e.g., 308, 310, and 312, . . . ), to form respective trust levels with each other (e.g., the sub-community of peers 314 can establish a certain trust level(s) with the other sub-community of peers 316 with regard to a context(s)), and so on. The trust component(s) 116 can facilitate managing and determining the respective trust levels of entities (and/or associated communication devices) within a sub-community, and facilitate managing and determining the respective trust levels of respective sub-communities of peers (e.g., 314; 316; . . . ). This distributed trust network 300 can be utilized, for example, instead of relying on existing systems and networks that verify and validate a device (e.g., a network node).

With further regard to FIG. 1, in some embodiments, the trust component 116 can maintain the level of distrust (or conversely, the trust level) of an entity (e.g., entity 110) with respect to the entity and/or the communication device(s) (e.g., communication device 102) associated with the entity (e.g., VA, other software-based entity, or human entity), such that the trust component 116 can have the level of distrust (or conversely, the trust level) follow the entity. The trust management component 122 can utilize one or more of a variety of identifiers, which can be determined to be associated with an entity (e.g., entity 110), to maintain an association (e.g., connection, link, tagging of, . . . ) between a distrust level (or conversely, a trust level) and the entity (e.g., entity 110). For example, the trust management component 122 can obtain and collect identifier information associated with an entity (e.g., 110) and can associate that identifier information with the entity. The identifier information can comprise, for example, a device identifier (e.g., device ID) associated with a communication device (e.g., communication device 102) of the entity, biometric information (e.g., fingerprint information, eye or iris information, voice information, . . . ) of the entity, addresses (e.g., physical (e.g., home or business) address(es); media access control (MAC) address(es), Internet Protocol (IP) address(es), or other communication network address(es), . . . ), Internet service provider (ISP) information, username(s), password(s), and/or other identifying information associated with the entity. For example, a distrusted entity (e.g., entity 110), having a relatively high level of distrust, can attempt to change its/his/her identity (e.g., online identity) by re-registering an account and/or with the trust component 116 under a different identity using the entity's communication device (e.g., communication device 102) in order to avoid having the high level of distrust associated with the entity. The trust management component 122 can analyze identifier information, such as, for example, the device ID associated with the entity's communication device and/or MAC address, IP address, or other communication network address associated with the communication device, associated with the new registration by the different identity presented by the entity. Based at least in part on the results of analyzing the identifier information, the trust management component 122 can determine that the different identity is associated with the entity (e.g., entity 110) that has a relatively high level of distrust in the trust network associated with the trust component 116. The trust management component 122 can apply the high distrust level to or associate the high distrust level with the different identity and associated communication device. By maintaining the level of distrust (or conversely, the trust level) of an entity with respect to the entity and/or the associated communication device(s), the trust component 116 can facilitate preventing a distrusted and/or malicious entity from changing its/his/her identity in order to avoid being associated with the distrust level (e.g., high distrust level).

The trust component 116 also can implement trust context across different entities (e.g., car purchaser, or baby sitter, . . . ) learning from a general balance of trust as well as learning from something specific for a specific action in connection with a transaction. For example, for respective entities, the trust component 116 (e.g., employing the trust management component 122) can determine respective trust levels (e.g., overall or general trust levels) of respective entities (e.g., 110, 112, 114, . . . ) based at least in part the respective actions of the respective entities with regard to a variety of contexts. The trust component 116 (e.g., employing the trust management component 122) also can determine respective context-specific trust levels of respective entities (e.g., 110, 112, 114, . . . ) based at least in part respective particular actions of the respective entities with regard to respective particular contexts. From the generalized trust levels of entities and the context-specific trust levels of entities, for an entity (or entities), the trust component 116 (e.g., employing the trust management component 122) can learn or identify attributes of entities that can span across contexts or be applicable to multiple contexts. For example, the trust component 116 (e.g., employing the trust management component 122) can learn or identify attributes that can be common or relatable to different contexts across a first entity (e.g., car purchaser) and a second entity (e.g., a baby sitter). The trust management component 122 can utilize the information learned from learning or identifying the attributes common or relatable to the different contexts across the first entity and the second entity to facilitate refining determinations of generalized trust levels for entities and/or context-specific trust levels for entities.

The trust component 116 also can be employed to facilitate new and/or improved relationships between suppliers/providers by validation of the trust network created using the trust component 116. This can increase connectivity across international enterprises, national enterprises, and/or other various scales of enterprises.

With further regard to the communication network 108 depicted in FIG. 1, a RAN of the communication network 108 can be associated with (e.g., connected to) or can comprise a core network (e.g., mobile core network) that can facilitate communications by communication devices (e.g., 102, 104, 106, . . . ) wirelessly connected to the communication network 108. A communication device (e.g., 102) can be communicatively connected to the core network via a base station. The core network can facilitate wireless communication of voice and data associated with communication devices (e.g., 102, 104, 106, . . . ) associated with the communication network 108. The core network can facilitate routing voice and data communications between communication devices and/or other communication devices (e.g., phone, computer, email server, multimedia server, audio server, video server, news server, financial or stock information server, other communication devices associated with an IP-based network (e.g., the Internet, an intranet, . . . ) (not shown in FIG. 1) associated with the communication network 108.

In accordance with various embodiments, the communication network 108 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., 102, 104, 106, . . . ) can be associated with (e.g., communicatively connected to) the communication network 108 via a wireless communication connection or a wireline (e.g., wired) communication connection (e.g., via a cell and associated base station). The respective communication devices (e.g., 102, 104, 106, . . . ) can operate and communicate in a communication network environment. At various times, a communication device (e.g., 102, 104, 106, . . . ) can be communicatively connected via a wireless communication connection(s) to one or more radio access networks (RANs), which can comprise one or more base stations to communicatively connect the communication device to the communication network 108 to enable the communication device to communicate other communication devices associated with (e.g., communicatively connected to) the communication network 108 in the communication network environment. The one or more RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 108 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 108 (e.g., a core network, cellular network, or a network comprising a core network, cellular network, and/or an IP-based network) can facilitate routing voice and data communications between a communication device(s) (e.g., 102, 104, or 106, . . . ) and another communication device associated with the communication network 108 in the communication network environment. The communication network 108 and/or the core network also can allocate resources to the communication devices in the communication network 108, convert or enforce protocols, establish and enforce quality of service (QoS) for the communication devices, provide applications or services in the communication network 108, translate signals, and/or perform other desired functions to facilitate system interoperability and communication in the communication network 108 (e.g., wireless portion of the communication network 108 or wireline portion of the communication network 108). The communication network 108 and/or the core network further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication devices 102) is moved through a wireless communication network environment, at various times, the communication device(s) can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station) can serve a specified coverage area to facilitate communication by the communication device(s) (e.g., 102) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., 102) located in the respective area covered by the respective cell, where such coverage can be achieved via a wireless link (e.g., uplink (UL), downlink (DL)). When an attachment attempt is successful, the communication device(s) (e.g., 102) can be served by the AP and incoming voice and data traffic can be paged and routed to the communication device(s) (e.g., 102) through the AP, and outgoing voice and data traffic from the communication device(s) (e.g., 102) can be paged and routed through the AP to other communication devices in the communication network environment. In an aspect, the communication device(s) (e.g., 102) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

The disclosed subject matter, by employing the trust component 116, including the trust management component 122, trust database component 118, action database component 120, and other features, as described herein, can be useful and beneficial in enabling entities (e.g., entity 112) to have sufficient knowledge regarding other entities (e.g., entity 110) in connection with attempted actions and a transaction to make an informed determination as to whether to engage in actions and transactions with other entities, including whether other entities are sufficiently trustworthy to make engaging in actions and transactions with them desirable (e.g., suitable, appropriate, or acceptable), and can enhance security of transactions for entities. The disclosed subject matter further can provide real-time evaluation of a trust assertion for an entity (e.g., VA, other software-based entity, an actual human entity), can increase security of actions and transactions between entities, and can facilitate avoiding intermediate, but faulty systems.

The disclosed subject matter, by employing the trust component 116, can have the ability to track trust (e.g., track trust levels) for entities (e.g., 110, 112, 114, . . . ) through more than merely identities of entities (e.g., can track trust based on performance of actions and execution of transactions by entities). The disclosed subject matter, by employing the trust component 116, can provide transparent rules regarding trust, as, for example, the trust component 116 can manage and maintain a balance sheet (e.g., a trust balance sheet) in the trust database component 118, wherein the trust management component 122 can utilize the balance sheet and other information to manage and assert trust with respect to entities (e.g., 110, 112, 114, . . . ).

The disclosed subject matter, by employing the trust component 116, also can facilitate building up a trusted community of entities (e.g., actual persons, business entities, VAs, other software-based entities, . . . ) that can objectively be asserted and evaluated by other entities (e.g., other entities of the community, or other entities in general). The disclosed subject matter, via the features provided by the trust component 116, further can provide the ability for entities (e.g., 110, 112, 114, . . . ) to establish line of credit (e.g., for trust) so that intermediate transactions are not continually asserted, which can facilitate the performance of high-speed transactions, for example.

Figure 4:
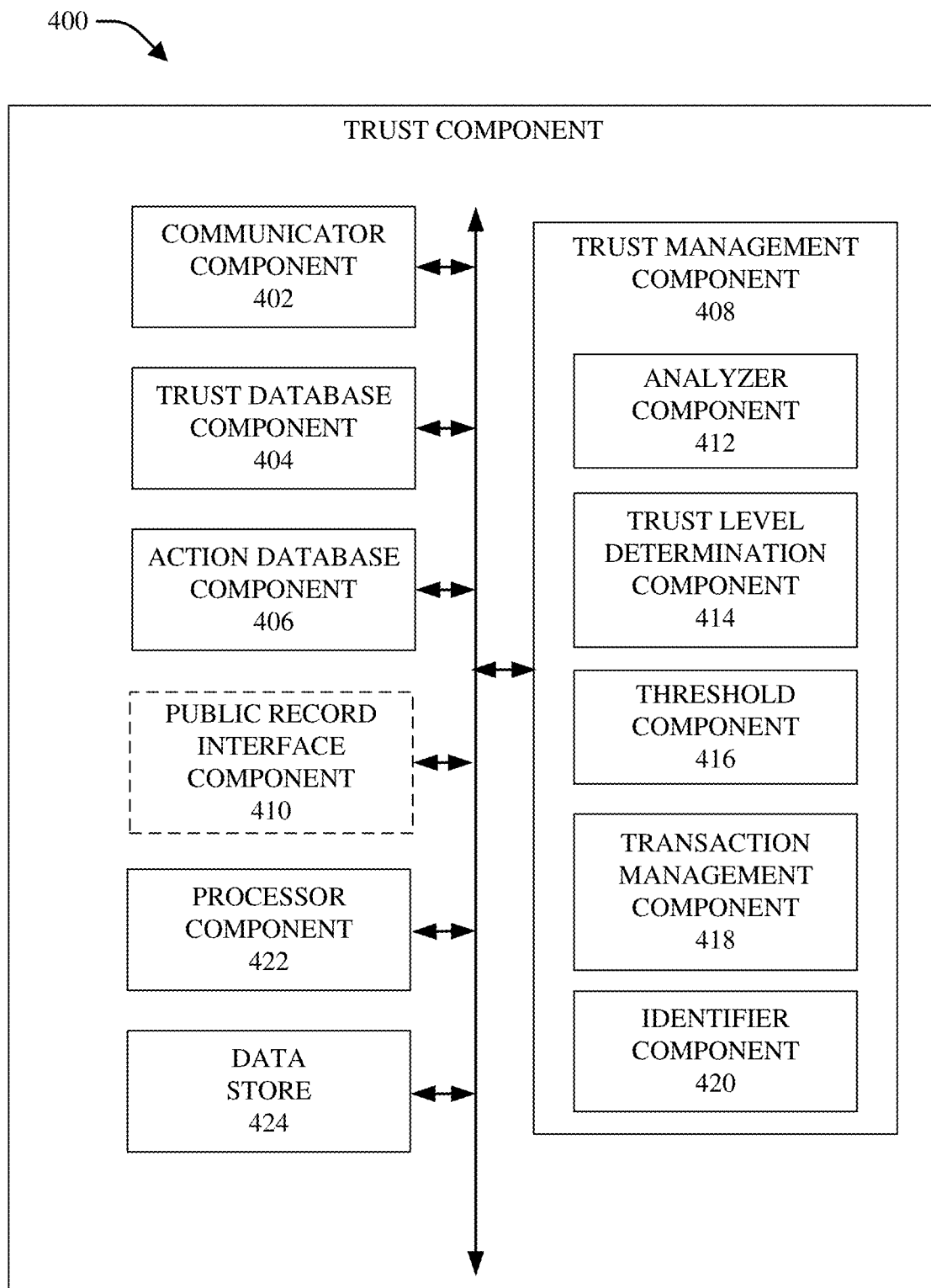
FIG. 4 illustrates a block diagram of an example trust component, in accordance with various aspects and embodiments of the disclosed subject matter.

FIG. 4 depicts a block diagram of an example trust component 400, in accordance with various aspects and embodiments of the disclosed subject matter. The trust component 400 can comprise, for example, a communicator component 402, a trust database component 404, an action database component 406, a trust management component 408, and a public record interface component 410. The trust database component 404, action database component 406, trust management component 408, and public record interface component 410 each can be the same as or similar to, and/or can comprise the same or similar functionality as, respective components (e.g., respectively named components), such as more fully described herein. The trust component 400 also can include a processor component 422, and a data store 424.

The communicator component 402 can transmit information from the trust component 400 to another component(s) or device(s) (e.g., communication device, network component or device, . . . ) and/or can receive information from the other component(s) or device(s). For instance, the communicator component 402 can receive (e.g., from respective communication devices of respective entities) information relating to a transaction, an attempted action associated with a transaction (e.g., performance of an action associated with a transaction by an entity), a trust conveyance provided by an entity, an entity associated with a transaction, a context associated with a transaction, identifier information (e.g., device ID, biometric information, communication network address, . . . ) associated with an entity, and/or other desired information. The communicator component 402 also can communicate information relating to, for example, a trust level of an entity to a communication device of another entity in connection with a transaction between the entities, an attempted action of the entity to request the other entity to perform a response action in connection with the transaction, a trust conveyance provided by an entity, identifier information associated with an entity, user interfaces, functions, services, or actions available to an entity based on the trust level of the entity, and/or other information.

The trust management component 408 can comprise an analyzer component 412, trust level determination component 414, threshold component 416, transaction management component 418, and identifier component 420. The trust management component 408 can control (e.g., manage) operations associated with the trust component 400. For example, the trust management component 408 can facilitate generating instructions to have components of the trust component 400 perform operations, and can communicate respective instructions to respective components (e.g., communicator component 402, trust database component 404, action database component 406, public record interface component 410, . . . ) of the trust component 400 to facilitate performance of operations by the respective components of the trust component 400 based at least in part on the instructions, in accordance with the defined trust criteria and the defined trust algorithm(s). The trust management component 408 also can facilitate controlling data flow between the respective components of the trust component 400 and controlling data flow between the trust component 400 and another component(s) or device(s) (e.g., communication device, base station or other component or device of the communication network) associated with (e.g., connected to) the trust component 400.

The analyzer component 412 can analyze information and can generate analysis results based at least in part on the results of the analysis. For example, the analyzer component 412 can analyze information relating to a trust level of an entity in connection with a context (e.g., an activity, a transaction, an underlying action of a transaction) and/or an applicable threshold trust level to facilitate determining whether the entity is permitted to perform a particular action associated with a transaction, as more fully described herein. As another example, the analyzer component 412 can analyze information relating to the performance of an entity during a transaction, including underlying actions performed during the transaction to facilitate determining whether the trust level of the entity is to be adjusted (e.g., increased or decreased) or is to remain at the same level and/or an amount of the adjustment (if any) to the trust level, as more fully described herein.

The trust level determination component 414 can determine respective trust levels of respective entities for respective contexts, in accordance with the defined trust criteria and the defined trust algorithm(s), as more fully described herein. For example, the trust level determination component 414 can determine or calculate (e.g., in conjunction with the analyzer component 412) a trust level for an entity for a particular context based at least in part on the results of analyzing information relating to the performance of actions of the entity with regard to a current transaction and/or previous transactions, and/or other information (e.g., trust conveyance(s)), as more fully described herein. As another example, trust level determination component 414 can determine whether to adjust (e.g., increase or decrease) a trust level of an entity and/or an amount of the adjustment (if any) to the trust level based at least in part on analysis results relating to the performance of actions by the entity during a transaction, as more fully described herein.

The threshold component 416 can be employed to determine, select, and/or apply respective threshold trust levels with respect to respective contexts (e.g., transactions, actions associated with transactions, activities, . . . ), such as more fully described herein. For example, based at least in part on a first context, the threshold component 416 can determine, select, and/or apply a first threshold trust level with respect to a trust level of an entity in connection with a first action (e.g., attempted action of the entity, or response action by another entity in response to the attempted action) associated with a transaction and/or a first activity relating to the transaction (e.g., to facilitate determining whether the trust level of the entity is sufficiently high enough to satisfy the first threshold trust level to approve the first action), in accordance with the defined trust criteria. Based at least in part on a second context, the threshold component 416 can determine, select, and/or apply a second threshold trust level with respect to a trust level of an entity in connection with a second action (e.g., attempted action of the entity, or response action by another entity in response to the attempted action) associated with a transaction and/or an activity (e.g., first activity or second activity) relating to the transaction, in accordance with the defined trust criteria.

The transaction management component 418 can control the performance or execution of transactions between entities, including the performance of respective underlying actions by respective entities. The transaction management component 418 also can control the functions or services that can be made available to respective entities based at least in part on the respective entities and respective contexts associated with the respective entities, in accordance with the defined trust criteria. The transaction management component 418 also can obtain and/or collect information relating to the transactions between entities to facilitate tracking the performance of actions by the entities during transactions.

The identifier component 420 can be employed to obtain and collect one or more of a variety of respective identifiers of respective entities, and can maintain respective associations (e.g., links) between respective identifiers and respective entities to facilitate identifying respective entities (e.g., even if an entity attempts to change or disguise its/his/her identity). For example, the identifier component 420 can obtain and collect identifier information associated with an entity and can associate that identifier information with the entity. The identifier information can comprise, for example, a device ID associated with a communication device of the entity, biometric information (e.g., fingerprint information, eye or iris information, voice information, . . . ) of the entity, addresses (e.g., physical address(es); MAC address(es), IP address(es), or other communication network address(es), . . . ), ISP information, username(s), password(s), and/or other identifying information associated with the entity. The identifier information collected by the identifier component 420 can be utilized to facilitate associating an entity with a distrust level (or conversely, a trust level) of the entity, even when the entity attempts to change its/his/her identification information and/or communication device (or across communication devices of the entity). This can facilitate preventing a distrusted and/or malicious entity from attempting to disguise its/his/her identity by taking on, or registering under, a different identity.

The processor component 422 that can work in conjunction with the other components (e.g., communicator component 402, trust database component 404, action database component 406, trust management component 408, public record interface component 410, and data store 424) to facilitate performing the various functions of the trust component 400. The processor component 422 can employ one or more processors, microprocessors, or controllers that can process data, such as information relating to transactions, actions associated with transactions, trust levels associated with entities, contexts and/or activities relating to transactions, threshold trust levels, identifier information associated with entities, user interfaces relating to transactions or trust services, parameters, traffic flows, policies, defined trust criteria, algorithms (e.g., defined trust algorithm(s)), protocols, interfaces, tools, and/or other information, to facilitate operation of the trust component 400, as more fully disclosed herein, and control data flow between the trust component 400 and other components (e.g., communication devices, base stations, other network devices of the communication network, data sources, applications) associated with the trust component 400.

The data store 424 that can store data structures (e.g., user data, metadata), code structure(s) (e.g., modules, objects, hashes, classes, procedures) or instructions, information relating to transactions, actions associated with transactions, trust levels associated with entities, contexts and/or activities relating to transactions, threshold trust levels, identifier information associated with entities, user interfaces relating to transactions or trust services, parameters, traffic flows, policies, defined trust criteria, algorithms (e.g., defined trust algorithm(s)), protocols, interfaces, tools, and/or other information, to facilitate controlling operations associated with the trust component 400. In an aspect, the processor component 422 can be functionally coupled (e.g., through a memory bus) to the data store 424 in order to store and retrieve information desired to operate and/or confer functionality, at least in part, to the communicator component 402, trust database component 404, action database component 406, trust management component 408, public record interface component 410, and data store 424, etc., and/or substantially any other operational aspects of the trust component 400.

Figure 5:
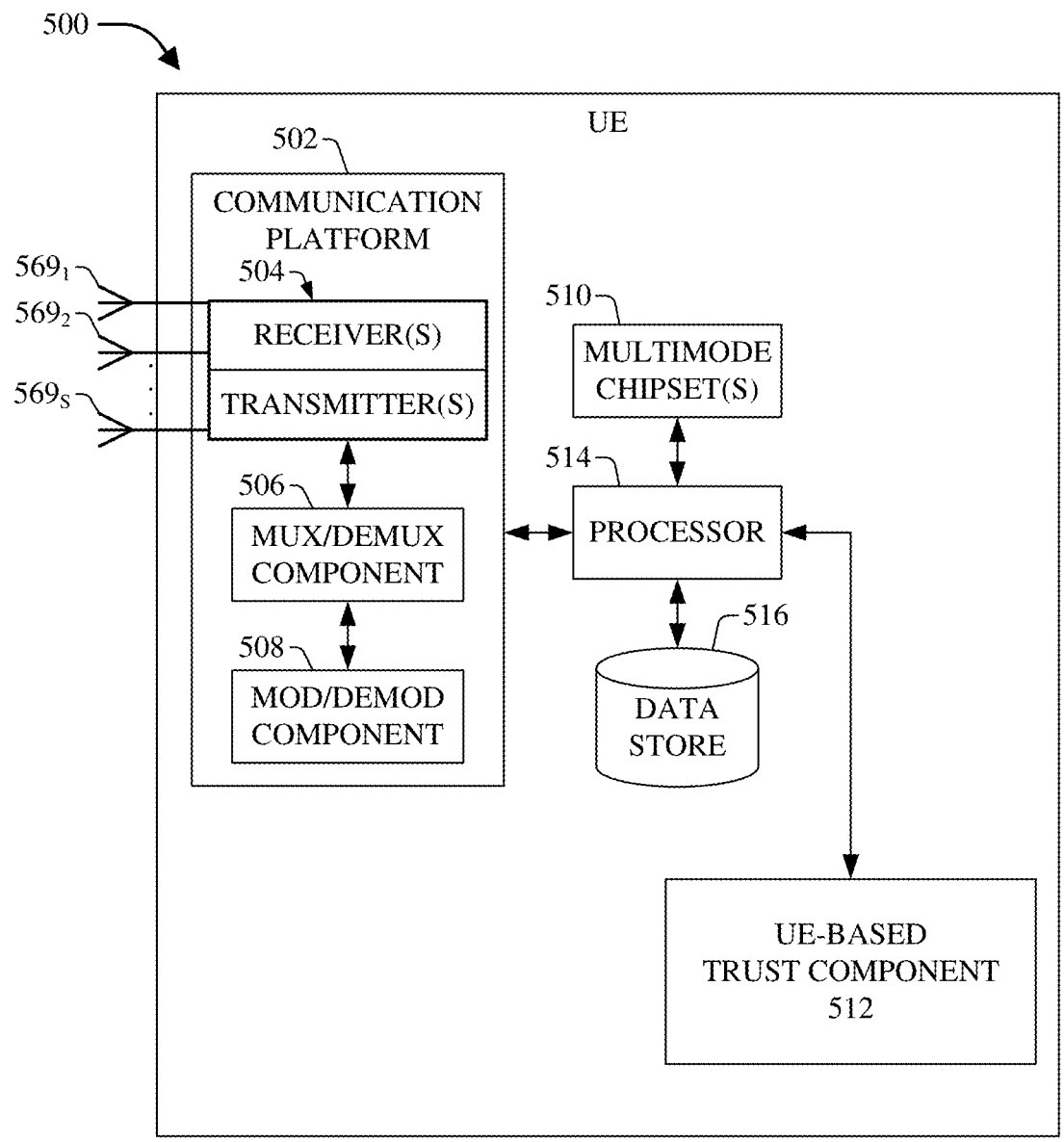
FIG. 5 presents a block diagram of an example user equipment (UE), in accordance with various aspects and embodiments of the disclosed subject matter.

FIG. 5 depicts a block diagram of an example UE 500 (e.g., communication device) in accordance with various aspects and embodiments of the disclosed subject matter. In accordance with various embodiments, the UE 500 (e.g., communication device) can be a multimode access terminal, wherein a set of antennas $569_1$-$569_S$ (S can be a positive integer) can receive and transmit signal(s) from and to wireless devices like access points, access terminals, wireless ports and routers, and so forth, that operate in a radio access network. It should be appreciated that antennas $569_1$-$569_S$ can be a part of communication platform 502, which comprises electronic components and associated circuitry that provide for processing and manipulation of received signal(s) and signal(s) to be transmitted; e.g., receivers and transmitters 504, multiplexer/demultiplexer (mux/demux) component 506, and modulation/demodulation (mod/demod) component 508.

In some implementations, the UE 500 can include a multimode operation chipset(s) 510 that can allow the UE 500 to operate in multiple communication modes in accordance with disparate technical specification for wireless technologies. In an aspect, multimode operation chipset(s) 510 can utilize communication platform 502 in accordance with a specific mode of operation (e.g., voice, global positioning system (GPS), . . . ). In another aspect, multimode operation chipset(s) 510 can be scheduled to operate concurrently (e.g., when S>1) in various modes or within a multitask paradigm.

The UE 500 can comprise a UE-based trust component 512 that can be the same as or similar to the trust component, as described herein. For instance, the UE-based trust component 512 can comprise all or at least a desired portion of the same or similar functionality of the trust component, as more fully described herein. The UE-based trust component 512 can be utilized by an entity, for example, to facilitate determining (e.g., automatically determining) whether to perform a response action (e.g., provide bank or credit account information of the entity) in response to an action attempted by another entity in connection with a transaction based at least in part on the trust level associated with the other entity, an applicable threshold trust level, and/or a given context, whether to accept a request to connect or interact with another entity with respect to a particular activity or transaction, whether to join a sub-community of entities, whether another entity is or potentially may be a distrusted and/or malicious entity, and/or other desired determinations relating to trust between the entity associated with the UE and other entities.

The UE 500 also can include a processor(s) 514 that can be configured to confer functionality, at least in part, to substantially any electronic component within the UE 500, in accordance with aspects of the disclosed subject matter. For example, the processor(s) 514 can facilitate enabling the UE 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 514 can facilitate enabling the UE 500 to process data relating to messaging, voice calls, or other services (e.g., Internet services or access); information relating to measurements of signal conditions with respect to cells; information relating to cells to facilitate connection to a source cell or target cell; information relating to parameters (e.g., UE parameters, network-related parameters); information relating to transactions and/or other trust-related services, as more fully described herein; and/or other data.

The UE 500 also can contain a data store 516 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal conditions with respect to cells; information relating to cells to facilitate connection to a source cell or target cell; information relating to parameters (e.g., UE parameters, network-related parameters); information relating to transactions and/or other trust-related services; UE identifier; information relating to voice calls, messaging, or other services associated with the UE 500; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 514 can be functionally coupled (e.g., through a memory bus) to the data store 516 in order to store and retrieve information (e.g., neighbor cell list; signal quality measurement-related information; cell-related information; parameter information; information relating to messaging, voice calls, or other services (e.g., interactive services); information relating to transactions and/or other trust-related services; frequency offsets; desired algorithms; security code; UE identifier; . . . ) desired to operate and/or confer functionality, at least in part, to communication platform 502, multimode operation chipset(s) 510, UE-based trust component 512, and/or substantially any other operational aspects of the UE 500.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
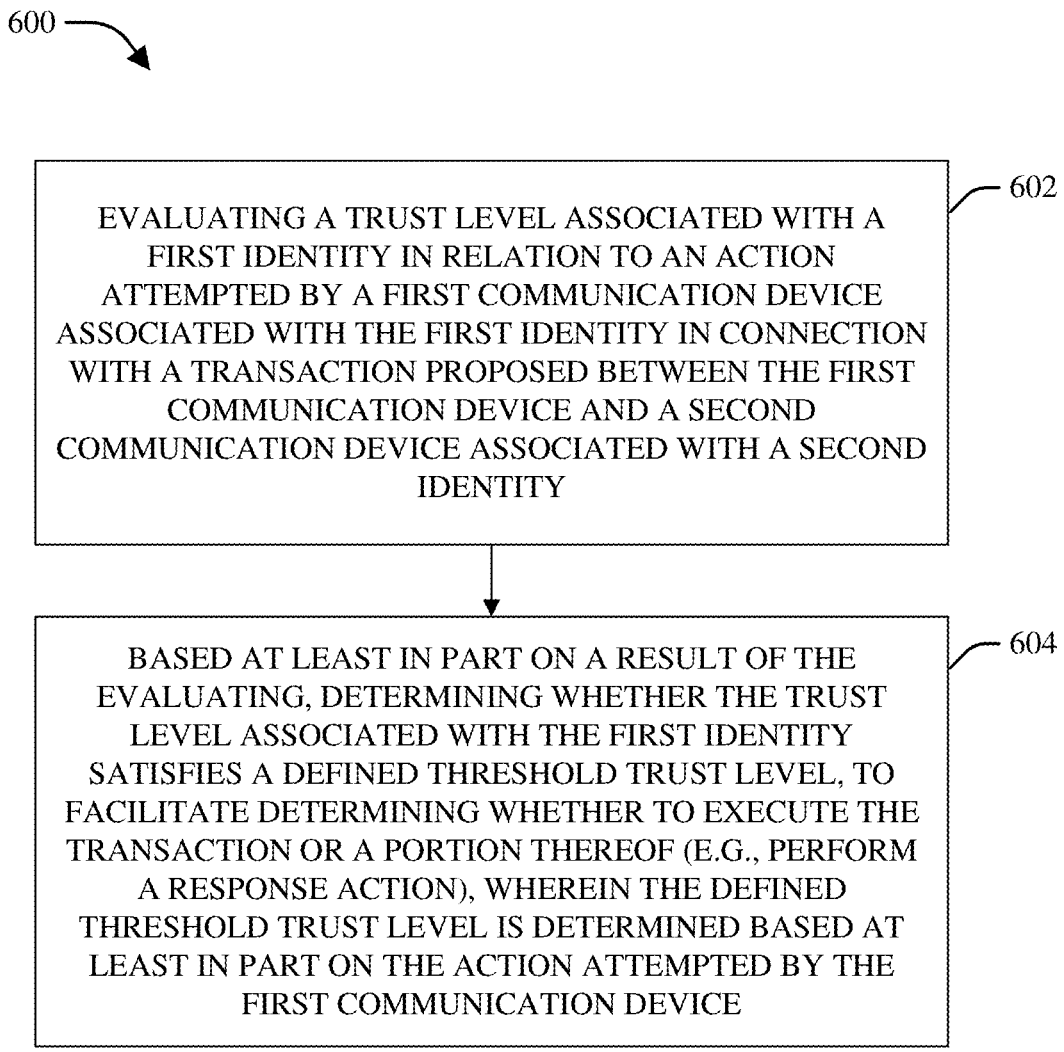
FIG. 6 illustrates a flow chart of an example method that can employ trust services to facilitate managing interactions between entities in a trusted environment, in accordance with various aspects and embodiments of the disclosed subject matter.
Figure 7:
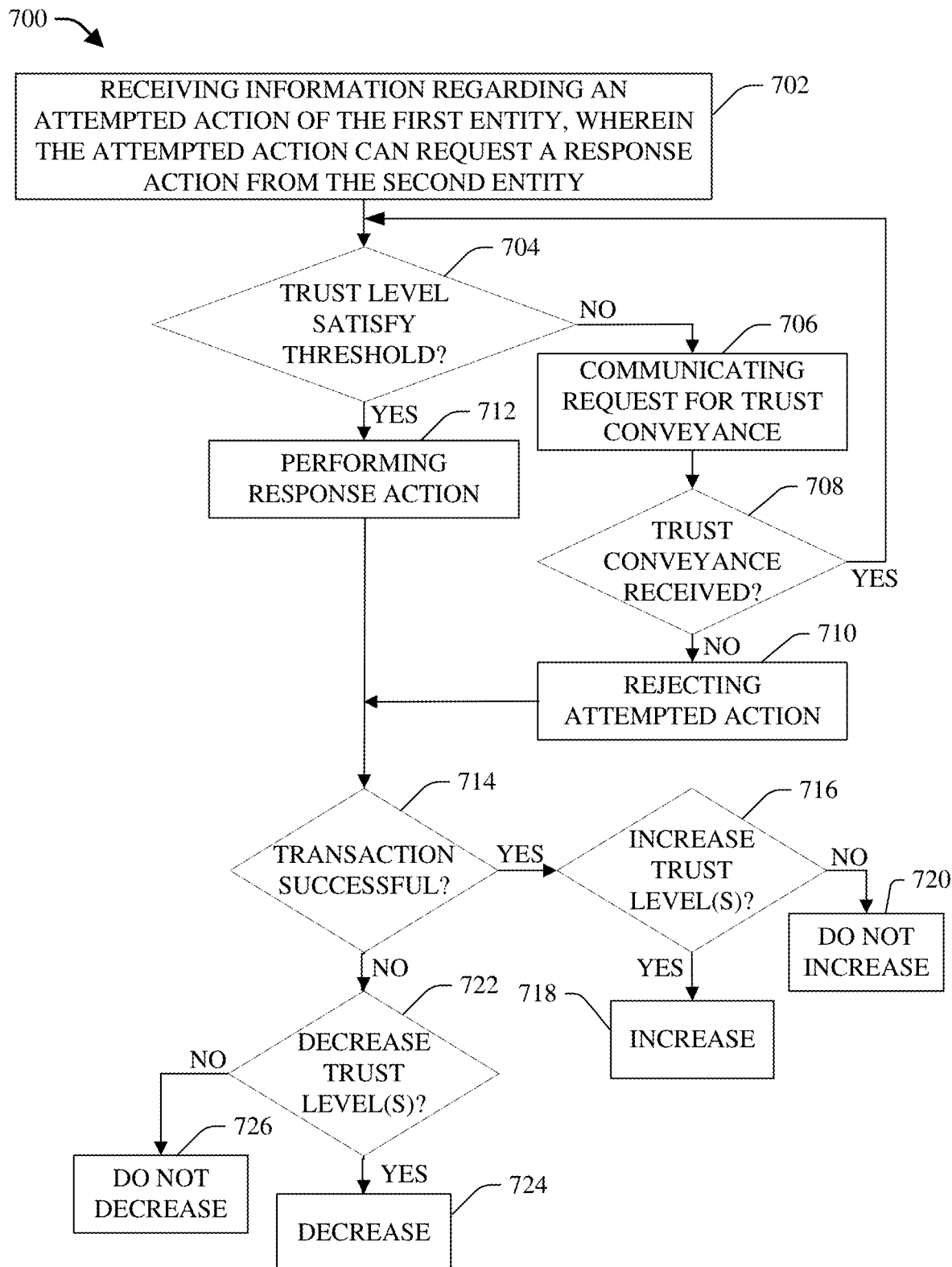
FIG. 7 presents a flow chart of another example method that can employ trust services to facilitate managing interactions between entities in a trusted environment, in accordance with various aspects and embodiments of the disclosed subject matter.
Figure 8:
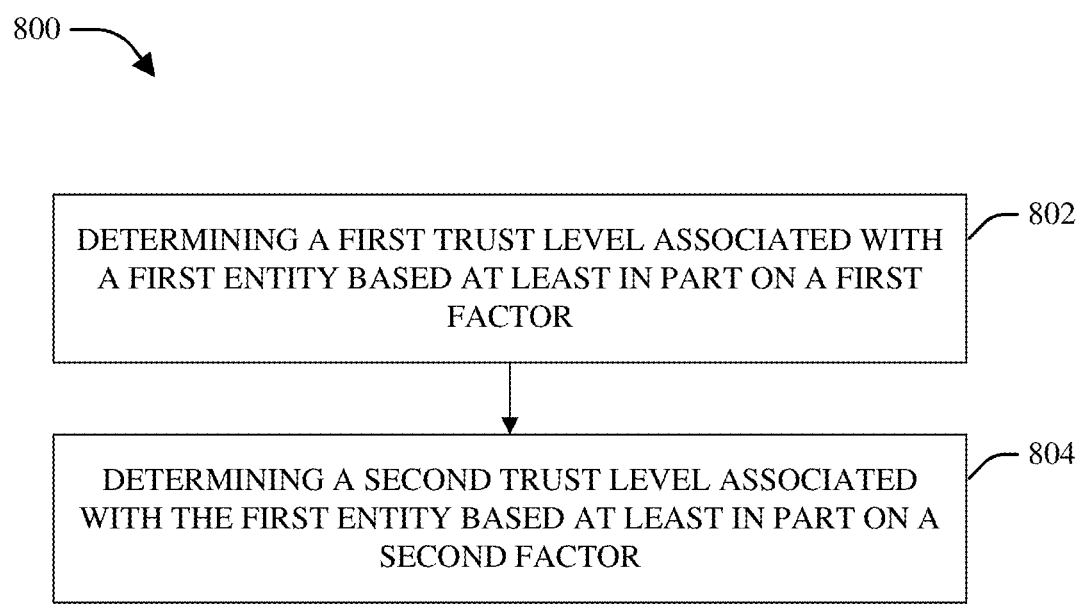
FIG. 8 depicts a flow chart of an example method that can determine respective trust levels associated with an entity with respect to respective factors, in accordance with various aspects and embodiments of the disclosed subject matter.

In view of the example systems and/or devices described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can employ trust services to facilitate managing interactions between entities in a trusted environment, in accordance with various aspects and embodiments of the disclosed subject matter. The method 600 can be employed by, for example, a system comprising a trust component, which can include a trust management component, a processor component (e.g., of or associated with the trust component), and/or a data store (e.g., of or associated with the trust component).

At 602, a trust level associated with a first identity can be evaluated in relation to an action attempted by a first communication device associated with the first identity in connection with a transaction proposed between the first communication device and a second communication device associated with a second identity. The trust management component (e.g., on behalf of the second entity associated with the second identity), and/or the second entity or second communication device, can evaluate the trust level associated with the first identity (e.g., a first identity of a first entity) in relation to an action attempted by the first communication device, which can be determined to be associated with the first identity, in connection with the transaction proposed between the first communication device and the second communication device, wherein the second communication device can be determined to be associated with the second identity.

At 604, based at least in part on a result of the evaluating, a determination can be made regarding whether the trust level associated with the first identity satisfies a defined threshold trust level, to facilitate determining whether to execute the transaction or a portion thereof (e.g., perform a response action), wherein the defined threshold trust level is determined based at least in part on the action attempted by the first communication device. Based at least in part on the result of the evaluating, the trust management component (e.g., on behalf of the second entity), and/or the second entity or second communication device, can determine whether the trust level associated with the first identity satisfies the defined threshold trust level, to facilitate determining whether to execute the transaction or portion thereof (e.g., a response action), wherein the defined threshold trust level can be determined (e.g., by the trust management component) based at least in part on the action attempted by the first communication device.

For example, the trust management component can determine whether the trust level associated with the first identity satisfies the defined threshold trust level. In response to determining that the trust level does satisfy the defined threshold trust level, the trust management component (e.g., on behalf of the second entity and/or in response to a request for a trust conveyance received from the second communication device) can determine that the action attempted by the first communication device can proceed and/or the second communication device and associated second entity can respond to the action of the first communication device (e.g., by providing financial account or card data associated with the second entity that is requested by the first communication device as part of the action) to facilitate the execution of the transaction.

In response to determining that the trust level does not satisfy the defined threshold trust level, the trust management component (e.g., on behalf of the second entity and/or in response to a request for a trust conveyance received from the second communication device) can deny or reject the action attempted by the first communication device and/or decline to respond to the action, or can request a trust conveyance from the first communication device for a trust conveyance that is sufficient to permit the attempted action to proceed and/or have the second communication device and associated second entity respond to the action of the first communication device. When a trust conveyance is requested, in response to receiving a sufficient trust conveyance from the first communication device, the trust management component (e.g., on behalf of the second entity and/or in response to a request for a trust conveyance received from the second communication device) can determine that the attempted action of the first communication device can proceed and/or can determine that the second communication device and associated second entity can respond, and/or can facilitate the second communication device and associated second entity responding, to the action of the first communication device, to facilitate execution of the transaction.

FIG. 7 presents a flow chart of another example method 700 that can employ trust services to facilitate managing interactions between entities in a trusted environment, in accordance with various aspects and embodiments of the disclosed subject matter. The method 700 can be employed by, for example, a system comprising a trust component, which can include a trust management component, a processor component (e.g., of or associated with the trust component), and/or a data store (e.g., of or associated with the trust component).

While the method 700 is described herein with regard to a first entity and a second entity, as desired, the method 700 can be modified and extended to encompass more than two entities and/or the method 700 can be implemented on multiple tracks (e.g., in parallel), wherein, for example, a first instance of the method 700 can be implemented with regard to a first entity and a second entity, and a second instance of the method 700 can be implemented (e.g., in parallel and/or simultaneously) with regard to the first entity and a third entity (e.g., when the first entity is acting as an intermediary to provide a product or service associated with the third entity to the second entity).

At 702, information regarding an attempted action of the first entity can be received, wherein the attempted action can request a response action from the second entity. The trust component can receive the information regarding the attempted action of the first entity from a first communication device associated with the first entity. The attempted action of the first entity can relate to an initial contact (e.g., a cold call) of the first entity with the second entity with regard to a transaction (e.g., sale of a product or service) that the first entity desires to propose to the second entity, or can relate to a subsequent contact between the first and second entities, for example, when the second entity has expressed an interest in the transaction proposed by the first entity to the second entity. The attempted action can request a response action (e.g., provide financial information (e.g., bank or credit card information, personal information, . . . ) from the second entity.

At 704, a determination can be made regarding whether the trust level of the first entity satisfies a defined threshold trust level with respect to the attempted action and/or another factor(s) (e.g., type of activity), in accordance with the defined trust criteria. In some embodiments, the trust management component (e.g., acting on behalf of the second entity) and/or the second communication device (e.g., acting on behalf of the second entity) can determine (e.g., automatically determine or identify) the trust level of the first entity with respect to the attempted action and/or the other factor(s) and/or can evaluate (e.g., automatically evaluate) the trust level of the first entity in relation to the defined threshold trust level, in accordance with the defined trust criteria, wherein the defined threshold trust level can be determined based at least in part on the attempted action and/or the other factor(s). For example, the trust management component, acting on behalf of the second entity, can evaluate the trust level of the first entity with respect to the attempted action and/or the other factor(s), based at least in part on the entity (e.g., user) profile of the second entity and/or information received from the second entity via the second communication device, in accordance with the defined trust criteria, wherein entity profile information in the entity profile and/or the received information can indicate the defined threshold trust level to apply and/or can indicate whether the trust level satisfies the defined threshold trust level.

In other embodiments, the trust management component can present (e.g., communicate) the trust level of the first entity to the second communication device of the second entity to enable the second entity to evaluate the trust level of the first entity in relation to the attempted action and/or the other factor(s) and/or the defined threshold trust level, in accordance with the defined trust criteria. The second entity, via the second communication device, can communicate, to the trust management component, information indicating whether the trust level of the first entity satisfies the defined threshold trust level (e.g., the threshold trust level desired by the second entity).

If it is determined that the trust level of the first entity does not satisfy the defined threshold trust level (and/or the second entity otherwise indicates that the trust level is not sufficient in relation to the attempted action and/or the other factor(s)), at 706, a request for a trust conveyance from the first entity can be communicated to the first communication device of the first entity. The trust management component can communicate a message (e.g., a trust conveyance request message) to the first communication device of the first entity to request that the first entity provide the trust conveyance to the trust component to facilitate ensuring that the first entity is sufficiently trustworthy for the second entity to respond by performing the response action that was desired by the first entity. The trust management component can request the trust conveyance from the first entity automatically on behalf of the second entity or in response to a message received from the second communication device of the second entity that indicates that the trust level is not sufficient and the trust conveyance is requested from the first entity.

The type(s) of trust conveyance requested from the can be a specific type and/or amount of trust conveyance or can be one (or more than one) of a number of different types and/or amounts of trust conveyances that would be acceptable to the trust management component and/or the second entity. The type(s) of trust conveyance can be or comprise, for example, one or more of the various types of trust conveyances described herein.

At 708, a determination can be made regarding whether the trust conveyance is received. The trust management component can determine whether the trust conveyance has been received from the first communication device of the first entity and/or another source associated with the first entity.

If it is determined that no trust conveyance has been received (e.g., within a defined amount of time), at 710, the attempted action of the first entity can be rejected. For instance, the trust management component can reject the attempted action of the first entity and terminate the transaction, in response to determining that the requested trust conveyance has not been received (e.g., timely received) from the first communication device and/or the other source. In some embodiments, the method 700 can proceed to reference numeral 714 from this point.

If, at 708, it is determined that the trust conveyance has been received, the method 700 can return to reference numeral 704 to determine whether the trust level (e.g., modified and/or temporarily increased trust level) of the first entity (comprising the initial trust level plus the increase (e.g., temporary or permanent increase) based at least in part on the trust conveyance) satisfies the defined threshold trust level with respect to the attempted action and/or the other factor(s) (e.g., type of activity), in accordance with the defined trust criteria. For instance, the trust management component, and/or the second communication device of the second entity via the trust management component, can receive information regarding the trust conveyance from the first communication device of the first entity and/or the other source (e.g., another communication device associated with another entity and the first entity). In response to receiving the trust conveyance, the trust management component can determine whether the trust level of the first entity satisfies the defined threshold trust level with respect to the attempted action and/or the other factor(s) (e.g., type of activity), in accordance with the defined trust criteria. The method 700 can proceed from that point.

Referring again to reference numeral 704, if (initially or after receipt of the trust conveyance), at 704, it is determined that the trust level of the first entity satisfies the defined threshold trust level with respect to the attempted action and/or the other factor(s), the method 700 can proceed to reference numeral 712, wherein, at 712, a response action can be performed to facilitate proceeding with the transaction. The trust management component (e.g., acting on behalf of the second entity) and/or the second communication device (e.g., acting on behalf of the second entity) can perform the response action to facilitate proceeding with the transaction.

At 714, a determination can be made regarding whether the transaction, including the underlying actions, was performed successfully. The trust management component can determine whether the transaction between the first entity and the second entity was performed successfully. For example, the trust management component can monitor and analyze the attempted action of the first entity, the response action of the second entity, the response (if any) to a request for a trust conveyance (if any), and/or any other actions performed by the respective entities during the transaction, and, based at least in part on the results of the analysis, the trust management component can determine whether the transaction between the first entity and the second entity was performed successfully, and whether the underlying actions of the transaction were performed successfully.

In response to determining that the transaction, including the underlying actions, was performed successfully, at 716, a determination can be made regarding whether to increase the respective trust levels of the first entity and/or the second entity. In response to determining that the transaction, including the underlying actions, was performed successfully, the trust management component can determine whether the respective trust levels of the first entity and/or the second entity are to be increased, and, if so, by how much the trust level(s) is to be increased, in accordance with the defined trust criteria. For instance (e.g., frequently), certain successful transactions, and/or successful performance of certain actions during transactions, can result in the trust level(s) of first entity and/or second entity being increased based at least in part on the defined trust criteria. However, in certain instances, a successful transaction, and/or successful performance of actions during the transaction, still may not result in result in an increase in the trust level of an entity for certain reasons, based at least in part on applicable defined trust criteria, wherein the certain reasons can comprise, for example, that the entity already has a relatively high trust level and the particular successful transaction or actions associated therewith were not significant enough to warrant an increase in the entity's trust level (e.g., the relatively small or minor transaction or associated actions were insignificant compared to the relatively high trust level of the entity), or the transaction overall was completed successfully, but one of the underlying actions of the transaction was not satisfactorily performed by one of the entities.

In response to determining that the trust level of the first entity and/or trust level of the second entity is or are to be increased, at 718, the trust level of the first entity and/or trust level of the second entity can be increased. In response to determining that the trust level of the first entity and/or trust level of the second entity is or are to be increased, the trust management component can accordingly increase the trust level of the first entity and/or the trust level of the second entity by a respective defined amount(s) (e.g., as determined by the trust management component), in accordance with the defined trust criteria.

In response to determining that the trust level of the first entity and/or trust level of the second entity is or are not to be increased, at 720, the trust level of the first entity and/or trust level of the second entity are not increased. In response to determining that the trust level of the first entity and/or trust level of the second entity is or are not to be increased, the trust management component can accordingly not increase the trust level of the first entity and/or the trust level of the second entity, in accordance with the defined trust criteria, wherein the trust level of the first entity and/or trust level of the second entity can, for example, remain at the same trust level, or in some instances can even be decreased.

Referring again to reference numeral 714, in response to determining that the transaction was not performed successfully and/or an underlying action(s) of the transaction was not performed successfully, at 722, a determination can be made regarding whether to decrease the trust level of the first entity and/or trust level of the second entity. In response to determining that the transaction was not performed successfully and/or an underlying action(s) of the transaction was not performed successfully, the trust management component can determine whether the respective trust levels of the first entity and/or the second entity are to be decreased, and, if so, by how much the trust level(s) is to be decreased, in accordance with the defined trust criteria. For instance (e.g., frequently), certain unsuccessful transactions, and/or unsuccessful (e.g., failed) performance of certain actions during transactions, can result in the trust level(s) of first entity and/or second entity being decreased based at least in part on the defined trust criteria. However, in some instances, an unsuccessful transaction, and/or unsuccessful performance of underlying actions during the transaction, still may not result in result in a decrease in the trust level of an entity for various reasons, based at least in part on applicable defined trust criteria. Such various reasons can comprise, for example, that the entity has a relatively high trust level and the particular successful transaction or underlying actions associated therewith were not significant enough to warrant a decrease in the entity's trust level (e.g., the failure of the relatively small or minor transaction or failure of the underlying action(s) was insignificant compared to the relatively high trust level of the entity), the entity being evaluated exercised suitable diligence in attempting to perform the underlying action(s) and/or attempting to achieve success of the transaction, which can make decreasing the entity's trust level inappropriate.

In response to determining that the trust level of the first entity and/or trust level of the second entity is to be decreased, at 724, the trust level of the first entity and/or the trust level of the second entity can be decreased, accordingly. In response to determining that the trust level of the first entity and/or trust level of the second entity is to be decreased, the trust management component can determine the respective amount(s) of decrease in the respective trust level(s) to apply, and can decrease the trust level of the first entity and/or the trust level of the second entity based at least in part on the determined amount(s) of decrease, in accordance with the defined trust criteria.

If, at 722, it is determined that the trust level of the first entity and/or trust level of the second entity is not to be decreased, at 726, the trust level of the first entity and/or the trust level of the second entity is accordingly not decreased. In response to determining that the trust level of the first entity and/or trust level of the second entity is not to be decreased, the trust management component can maintain the trust level of the first entity and/or the trust level of the second entity at the same trust level(s), in accordance with the defined trust criteria.

FIG. 8 depicts a flow chart of an example method 800 that can determine respective trust levels associated with an entity with respect to respective factors, in accordance with various aspects and embodiments of the disclosed subject matter. The method 800 can be employed by, for example, a system comprising a trust component, which can include a trust management component, a processor component (e.g., of or associated with the trust component), and/or a data store (e.g., of or associated with the trust component).

At 802, a first trust level associated with a first entity can be determined based at least in part on a first factor. The trust management component can determine the first trust level associated with the first entity based at least in part on the first factor. For instance, the trust management component can evaluate the trust-related history with regard to actions, transactions, or interactions of the first entity with regard to other entities and/or other relevant information (e.g., authentication and/or business credentials, reviews, etc., of the first entity) in relation to (e.g., as it pertains or is relevant to) the first factor. The first factor can relate to a first type of activity (e.g., business activity, financial activity, work activity, athletic or sport activity, . . . ), a first type of transaction (e.g., a non-financial transaction, a financial transaction, . . . ), or another desired first factor.

At 804, a second trust level associated with the first entity can be determined based at least in part on a second factor. The trust management component can determine the second trust level associated with the first entity based at least in part on the second factor, wherein the second trust level can be different from or same as the first trust level, based at least in part on the defined trust criteria. For instance, the trust management component can evaluate the trust-related history with regard to actions, transactions, or interactions of the first entity with regard to other entities and/or other relevant information (e.g., authentication and/or business credentials, reviews, etc., of the first entity) in relation to (e.g., as it pertains or is relevant to) the second factor. The second factor can relate to a second type of activity, a second type of transaction, or another desired second factor.

In some embodiments, the trust management component can determine another trust level (e.g., an overall, a general, a hybrid, or a comprehensive trust level) based at least in part on multiple factors (e.g., multiple significant factors). For example, the trust management component can determine a trust level associated with the first entity based at least in part on the results of evaluating the trust-related history with regard to actions, transactions, or interactions of the first entity with regard to other entities and/or other relevant information in relation to the first factor, the second factor, and/or another factor(s), in accordance with the defined trust criteria.

Figure 9:
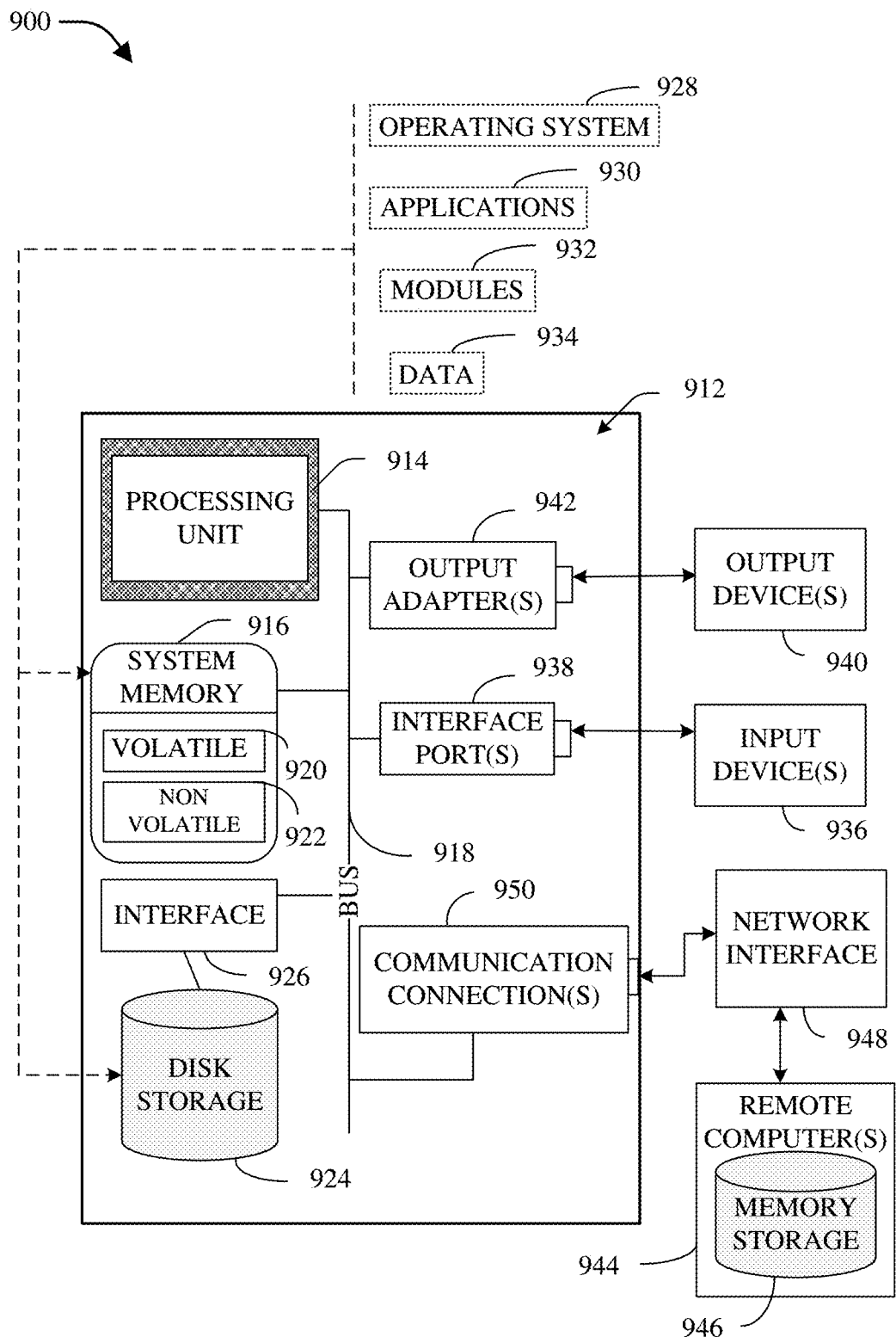
FIG. 9 is a schematic block diagram illustrating a suitable operating environment.
Figure 10:
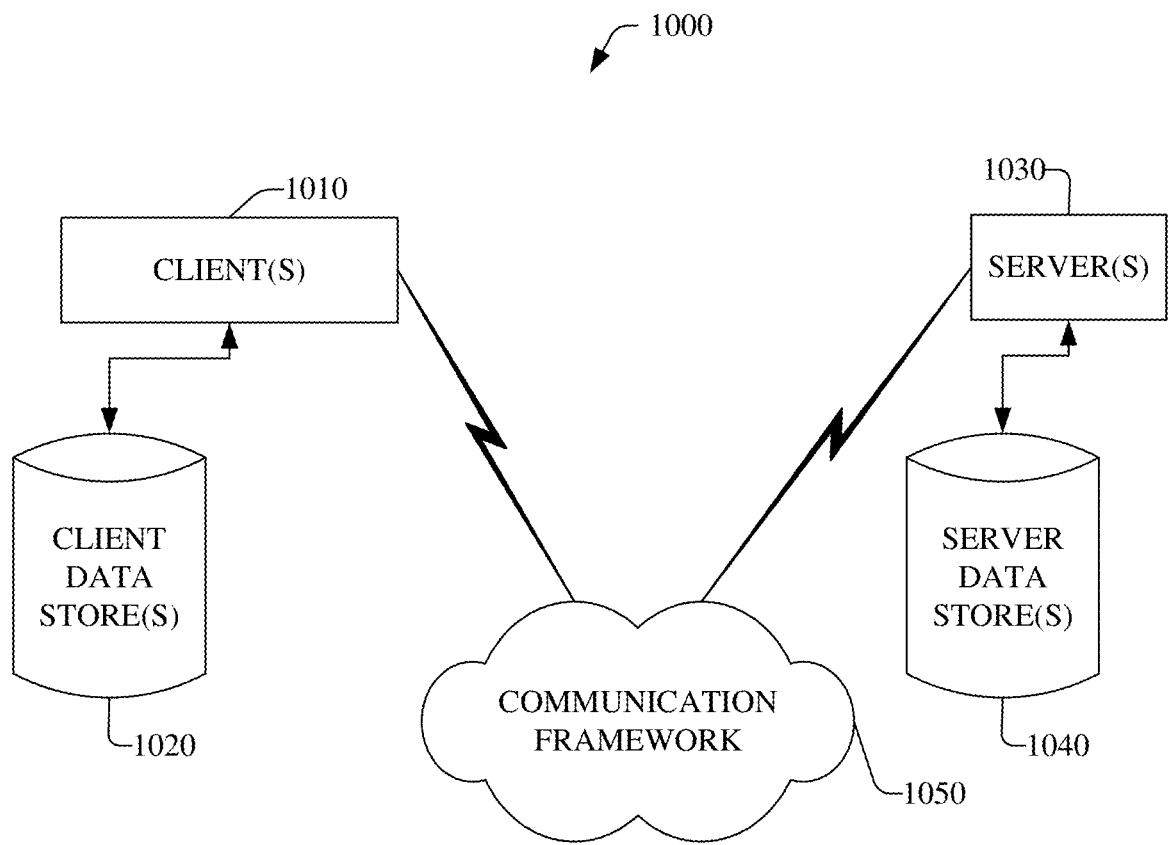
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 9, a suitable environment 900 for implementing various aspects of this disclosure includes a computer 912. The computer 912 includes a processing unit 914, a system memory 916, and a system bus 918. It is to be appreciated that the computer 912 can be used in connection with implementing one or more of the systems, components, or methods shown and described in connection with FIGS. 1-8, or otherwise described herein. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934 stored, e.g., in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 (e.g., computing system) with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., trust component, trust management component, trust database component, action database component, public records interface component, communication device, communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   evaluating, by a system comprising a processor, a trust level associated with a first identity in relation to a first action attempted by a first device, determined to be associated with the first identity, in connection with a transaction proposed between the first device and a second device determined to be associated with a second identity;
   based on a result of the evaluating, determining, by the system, whether the trust level associated with the first identity satisfies a first defined threshold trust level, to facilitate determining whether to execute the transaction, wherein the first defined threshold trust level is determined based on the first action attempted by the first device, wherein the first defined threshold trust level is higher than a second defined threshold trust level associated with a second action that is determined to have a second risk level that is lower than a first risk level of the first action based on the first action involving a first request to obtain financial account information associated with the second identity and the second action involving a second request to obtain non-financial information associated with the second identity, and wherein the transaction involves a performance of a task comprising a group of sub-tasks that comprise a first sub-task and a second sub-task; and
   creating, by the system, a trusted mesh network of devices, comprising the first device and a third device, to perform the group of sub-tasks associated with the transaction based on trust levels associated with the devices of the trusted mesh network being determined to satisfy a third defined threshold trust level associated with the transaction, wherein, as part of the trusted mesh network of devices, the first device is selectable to perform the first sub-task and the third device is selectable to perform the second sub-task.

2. The method of claim 1, further comprising:
   requesting, by the system, a trust conveyance from the first device, in response to a third request, from the second device, for the trust conveyance and based on a determination that the trust level associated with the first identity does not satisfy the first defined threshold trust level with respect to the first action;
   communicating, by the system, the third request for the trust conveyance to the first device;
   receiving, by the system, the trust conveyance from the first device to facilitate satisfying the first defined threshold trust level; and
   communicating, by the system, information relating to the trust conveyance to the second device.

3. The method of claim 2, wherein the trust conveyance comprises at least one type of trust conveyance of a group of types of trust conveyances comprising review data relating to reviews associated with the first identity, history data relating to successful transactions associated with the first identity, financial data associated with the first identity, trust symbol data provided to the first identity by a third-party identity, a trust token associated with the first identity, identification data associated with the first identity, a business credential associated with the first identity, an audit trail associated with the first identity, and an authentication credential associated with the first identity.

4. The method of claim 1, further comprising:
   communicating, by the system, payment data associated with the second identity to the first device to facilitate executing the transaction, wherein the payment data is received from the second device, wherein the payment data comprises the financial account information, wherein the payment data is to be forwarded by the first device to the third device determined to be associated with a third identity, to facilitate executing a portion of the transaction via the third device or the third identity, and wherein the portion of the transaction comprises the second sub-task; and
   in response to receiving a message from the first device or the third device indicating that payment associated with the transaction has failed based on the payment data being determined not to be valid, determining, by the system, whether the trust level associated with the first identity is to be reduced.

5. The method of claim 4, further comprising:
   in response to receiving the message indicating that the payment associated with the transaction has failed, determining, by the system, that the trust level associated with the first identity is to be reduced by a defined amount based on the failure of the payment and at least one of based on the trust level not satisfying a fourth defined threshold trust level or based on the first identity being determined not to have performed a defined validation attempt to validate the payment data associated with the second identity, and wherein the fourth defined threshold trust level indicates that the trust level is to be reduced by the defined amount, in response to determining that the trust level is below the fourth defined threshold trust level.

6. The method of claim 4, further comprising:
   in response to receiving the message indicating that the payment associated with the transaction has failed, determining, by the system, that the trust level associated with the first identity is to remain at a same trust level at least one of based on the trust level satisfying a fourth defined threshold trust level or based on the first identity being determined to have performed a defined validation attempt to validate the payment data associated with the second identity, and wherein the fourth defined threshold trust level indicates that the trust level is not to be reduced due to the failure of the payment, in response to determining the trust level satisfies the fourth defined threshold trust level.

7. The method of claim 4, wherein the trust level is a first trust level, wherein the failure of the payment is at least an initial payment failure, and wherein the method further comprises:
   based on the initial payment failure, receiving, by the system, a third request, from the third device, for a trust conveyance from the first identity, to facilitate gaining an approval for the execution of the portion of the transaction by the third device or the third identity; and communicating, by the system, the third request for the trust conveyance to the first device.

8. The method of claim 7, further comprising:
in response to the third request for the trust conveyance, receiving, by the system, the trust conveyance from the first device; and
communicating, by the system, information relating to the trust conveyance to the third device, to facilitate the gaining of the approval for the execution of the portion of the transaction by the third device or the third identity.

9. The method of claim 4, wherein the trust level is a first trust level, wherein the failure of the payment is at least an initial payment failure, and wherein the method further comprises:
in response to receiving the message indicating at least the initial payment failure, determining, by the system, that the portion of the transaction is to be executed by at least one of the third identity or the third device based on a second trust level associated with the first identity being determined to satisfy a fourth defined threshold trust level, and wherein the fourth defined threshold trust level indicates that the second trust level is sufficiently trustworthy to permit the execution of the portion of the transaction by at least one of the third identity or the third device even though the payment associated with the transaction has failed.

10. The method of claim 1, further comprising:
in response to a successful performance of the transaction, increasing, by the system, the trust level associated with the first identity.

11. The method of claim 1, wherein the trust level is a first trust level, and wherein the method further comprises:
determining, by the system, the first trust level based on a first type of activity that is related to the first action; and
determining, by the system, a second trust level based on a second type of activity that is related to a third action, wherein the second trust level is different from the first trust level based on the second type of activity being different from the first type of activity.

12. The method of claim 1, further comprising:
determining, by the system, the first defined threshold trust level based on the first action; and
determining, by the system, the second defined threshold trust level based on the second action, wherein the second defined threshold trust level is lower than the first defined threshold trust level based on a determination that the second risk level associated with the second action is lower than the first risk level associated with the first action, wherein the financial account information requested by the first action comprises bank account information or credit account information associated with the second identity, and wherein the non-financial information requested by the second action comprises an email address associated with the second identity.

13. A system, comprising:
a processor; and
a memory that stores executable instructions that, when executed by the processor, facilitate performance of operations, comprising:
analyzing a trust value associated with a first identity with respect to a first action determined to be initiated by a first device associated with the first identity in connection with a transaction proposed between the first device and a second device associated with a second identity;
based on a result of the analyzing, determining whether the trust value associated with the first identity satisfies a first defined threshold trust value, to facilitate determining whether to perform the transaction, wherein the first defined threshold trust value is determined based on the first action initiated via the first device, and wherein the first defined threshold trust value is greater than a second defined threshold trust value associated with a second action that is associated with a second risk level that is lower than a first risk level associated with the first action based on the first action relating to a first request to obtain financial account information associated with the second identity from the second device and the second action relating to a second request to obtain non-financial information associated with the second identity, and wherein the transaction comprises a performance of a task comprising a group of sub-tasks that comprise a first sub-task and a second sub-task; and
establishing a mesh network of devices, comprising the first device and a third device, to perform the group of sub-tasks associated with the transaction based on trust values associated with the devices of the mesh network being determined to satisfy a third defined threshold trust value associated with the transaction, wherein the first device is determined to be trusted to perform the first sub-task and the third device is determined to be trusted to perform the second sub-task, in accordance with the third defined threshold trust value.

14. The system of claim 13, wherein the operations comprise:
in response to a third request, from the second device, for a trust conveyance and based on the trust value associated with the first identity being determined not to satisfy the first defined threshold trust value with respect to the first action, requesting the trust conveyance from the first device;
communicating the third request for the trust conveyance to the first device;
receiving the trust conveyance from the first device, to facilitate satisfying the first defined threshold trust value; and
communicating information relating to the trust conveyance to the second device.

15. The system of claim 13, wherein the trust value is a first trust value, and wherein the operations comprise:
communicating payment information associated with the second identity to the first device to facilitate performance of the transaction, wherein the payment information is received from the second device, wherein the payment information comprises the financial account information, wherein the payment information is to be forwarded by the first device to the third device associated with a third identity to facilitate performance of a portion of the transaction via the third device, and wherein the portion of the transaction comprises the second sub-task; and
in response to receiving a message from the third device indicating that payment associated with the transaction has failed based on the payment information being determined not to be verified, determining whether the first trust value associated with the first identity is to be reduced by a first defined amount, and determining whether a second trust value associated with the second identity is to be reduced by a second defined amount.

16. The system of claim 15, wherein the operations comprise:

in response to receiving the message indicating that the payment associated with the transaction has failed, determining that the first trust value associated with the first identity is to be reduced by the first defined amount based on the failure of the payment and at least one of based on the trust value not satisfying a fourth defined threshold trust value or based on a determination that a defined verification attempt was not performed in connection with the first identity to verify the payment information associated with the second identity, and wherein the fourth defined threshold trust value indicates that the first trust value, being determined to be below the fourth defined threshold trust value, is to be reduced by the first defined amount; and requesting, on behalf of the third identity, a trust conveyance from the first device, to facilitate obtaining approval for the performance of the portion of the transaction by the third device or an entity associated with the third device.

17. The system of claim 15, wherein the operations comprise:

in response to receiving the message indicating that the payment associated with the transaction has failed, determining that the first trust value associated with the first identity is to remain at a same trust value at least one of based on the first trust value satisfying a fourth defined threshold trust value or based on a determination that a defined verification attempt was performed in connection with the first identity to verify the payment information associated with the second identity, and wherein the fourth defined threshold trust value indicates that the first trust value is not to be reduced due to the failure of the payment based on the first trust value being determined to satisfy the fourth defined threshold trust value.

18. The system of claim 13, wherein the operations comprise:

in response to determining that the transaction has been performed successfully, increasing the trust value associated with the first identity by a defined amount.

19. A non-transitory machine-readable medium, comprising executable instructions that, when executed by a processor, facilitate performance of operations, comprising:

in relation to a first action taken by a first device associated with a first identity, evaluating a trust level associated with the first identity with regard to a transaction proposed between the first device and a second device associated with a second identity;

based on a first result of the evaluating, determining whether the trust level associated with the first identity satisfies a first defined threshold trust level;

based on a second result of the determining, determining whether to perform the transaction, wherein the first defined threshold trust level is determined based on the first action taken by the first device, wherein the first defined threshold trust level is higher than a second defined threshold trust level associated with a second action that is determined to have a second amount of risk that is lower than a first amount of risk of the first action based on the first action relating to requesting financial information associated with the second identity and the second action relating to requesting non-financial information associated with the second identity, and wherein the transaction involves a performance of a task comprising a group of sub-tasks that comprise a first sub-task and a second sub-task; and forming a distributed network of devices, comprising the first device and a third device, to perform the group of sub-tasks associated with the transaction based on trust levels associated with the devices of the distributed network being determined to satisfy a third defined threshold trust level associated with the transaction, wherein, as part of the distributed network of devices, the first device is selectable to perform the first sub-task and the third device is selectable to perform the second sub-task.

20. The non-transitory machine-readable medium of claim 19, wherein the operations further comprise:

in response to a request, from the second device, for a trust conveyance and based on the trust level associated with the first identity being determined not to satisfy the first defined threshold trust level with respect to the first action, requesting the trust conveyance from the first device;

communicating the request for the trust conveyance to the first device;

receiving the trust conveyance from the first device to facilitate satisfying the first defined threshold trust level; and communicating information relating to the trust conveyance to the second device.

* * * * *